US011457485B2

United States Patent
Khalid et al.

(10) Patent No.: US 11,457,485 B2
(45) Date of Patent: Sep. 27, 2022

(54) METHODS AND APPARATUS FOR ENHANCING COVERAGE IN QUASI-LICENSED WIRELESS SYSTEMS

(71) Applicant: Charter Communications Operating, LLC, St. Louis, MO (US)

(72) Inventors: Saran Khalid, Denver, CO (US); MohammedYusuf Shaikh, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/676,188

(22) Filed: Nov. 6, 2019

(65) Prior Publication Data

US 2021/0136838 A1     May 6, 2021

(51) Int. Cl.
    *H04W 76/10*      (2018.01)
    *H04W 28/24*      (2009.01)
    (Continued)

(52) U.S. Cl.
    CPC ......... *H04W 76/10* (2018.02); *H04L 12/2803* (2013.01); *H04W 16/14* (2013.01);
    (Continued)

(58) Field of Classification Search
    CPC ........... H04L 12/2801; H04L 12/2803; H04W 16/14; H04W 72/0453
See application file for complete search history.

(56) References Cited

U.S. PATENT DOCUMENTS

| | | |
|---|---|---|
| 5,995,499 A | 11/1999 | Hottinen et al. |
| 6,154,648 A | 11/2000 | Comer |
| | (Continued) | |

FOREIGN PATENT DOCUMENTS

| | | |
|---|---|---|
| GB | 2585394 A | 1/2021 |
| WO | WO-2013020599 A1 | 2/2013 |
| WO | WO-2017130494 A1 | 8/2017 |

OTHER PUBLICATIONS

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
IEE Std.802.11, 1997.
Wi-Fi Peer to Peer (P2P) Specification, copyright 2014, Wi-Fi Alliance.

(Continued)

*Primary Examiner* — Raj Jain
(74) *Attorney, Agent, or Firm* — Patent Beach PC

(57) ABSTRACT

Methods and apparatus for enhancing area coverage and data rates in a quasi-licensed wireless communication network. In one embodiment, the methods and apparatus utilize so-called "quasi-licensed" CBRS (Citizens Broadband Radio Service) wireless spectrum in conjunction with a cellular wireless communication network (e.g. 4G, 5G, or LTE) for the delivery of services to a number of installed fixed wireless apparatus (CPE/FWA) at user or subscriber premises. The CPE/FWAs may act as relays or supplementation devices to provide requisite data rates to the CPEs that are out of the network coverage, effectively adding new customers to the network. As such, the CPEs that acts as relays are connected to one or more base stations, dynamically allocate some resources to the out of coverage CPEs, for the delivery/receipt of information to/from the out-of-coverage CPES/FWA.

20 Claims, 24 Drawing Sheets

(51) Int. Cl.
*H04W 16/14* (2009.01)
*H04W 28/20* (2009.01)
*H04W 72/04* (2009.01)
*H04L 12/28* (2006.01)
*H04L 29/06* (2006.01)
*H04L 69/16* (2022.01)

(52) U.S. Cl.
CPC ............ *H04W 28/20* (2013.01); *H04W 28/24* (2013.01); *H04W 72/04* (2013.01); *H04W 72/0453* (2013.01); *H04L 69/16* (2013.01)

(56) References Cited

U.S. PATENT DOCUMENTS

| | | |
|---|---|---|
| 6,356,560 B1 | 3/2002 | Venters et al. |
| 6,771,953 B1 | 8/2004 | Chow et al. |
| 6,782,262 B1 | 8/2004 | Lundborg |
| 9,258,809 B2 | 2/2016 | Liao et al. |
| 9,526,056 B2 | 12/2016 | Tomici et al. |
| 9,699,663 B1 | 7/2017 | Jovancevic |
| 9,769,692 B2 | 9/2017 | Freda et al. |
| 9,807,778 B2 | 10/2017 | Ma et al. |
| 9,813,148 B2 | 11/2017 | Syed et al. |
| 10,098,568 B2 | 10/2018 | Gazdzinski |
| 10,135,730 B2 | 11/2018 | Chou |
| 10,340,976 B2 | 7/2019 | Kakinada et al. |
| 10,405,192 B2 | 9/2019 | Kakinada et al. |
| 10,492,204 B2 | 11/2019 | Kakinada et al. |
| 10,499,409 B2 | 12/2019 | Shattil |
| 10,506,456 B2 | 12/2019 | Lou et al. |
| 10,531,309 B1 | 1/2020 | Li et al. |
| 10,536,859 B2 | 1/2020 | Gunasekara et al. |
| 10,680,883 B2 | 6/2020 | Hall et al. |
| 10,805,562 B2 | 10/2020 | Nakamura |
| 11,026,205 B2 | 6/2021 | Hmimy et al. |
| 11,219,026 B2 | 1/2022 | Kakinada et al. |
| 2002/0122040 A1 | 9/2002 | Noyle |
| 2003/0146826 A1 | 8/2003 | Viana et al. |
| 2003/0158906 A1 | 8/2003 | Hayes |
| 2004/0001021 A1 | 1/2004 | Choo et al. |
| 2004/0230754 A1 | 11/2004 | Gumm et al. |
| 2005/0186956 A1 | 8/2005 | Grindahl et al. |
| 2006/0188004 A1 | 8/2006 | Kizu et al. |
| 2008/0010506 A1 | 1/2008 | Tabei et al. |
| 2008/0097913 A1 | 4/2008 | Dicks et al. |
| 2008/0126540 A1 | 5/2008 | Zeng et al. |
| 2008/0220788 A1 | 9/2008 | Stanwood et al. |
| 2009/0253438 A1 | 10/2009 | Chater-Lea et al. |
| 2009/0323516 A1 | 12/2009 | Bhagwan et al. |
| 2010/0094956 A1* | 4/2010 | Zuckerman .......... H04L 67/1002 709/219 |
| 2010/0128608 A1 | 5/2010 | Zou et al. |
| 2010/0234042 A1 | 9/2010 | Chan et al. |
| 2010/0262722 A1 | 10/2010 | Vauthier et al. |
| 2011/0014924 A1* | 1/2011 | Hwang .............. H04W 72/082 455/452.1 |
| 2011/0314462 A1 | 12/2011 | Clark et al. |
| 2013/0007413 A1 | 1/2013 | Thomson et al. |
| 2013/0109323 A1 | 5/2013 | Ruutu et al. |
| 2013/0122903 A1 | 5/2013 | Farnsworth et al. |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0035182 A1 | 2/2014 | Boyer et al. |
| 2014/0106672 A1 | 4/2014 | Jeon et al. |
| 2014/0194068 A1* | 7/2014 | Coppage .............. H04W 24/08 455/67.11 |
| 2014/0269526 A1 | 9/2014 | Mitola, III |
| 2014/0308986 A1 | 10/2014 | Yang et al. |
| 2015/0052512 A1 | 2/2015 | Kostadinov et al. |
| 2015/0055623 A1 | 2/2015 | Li et al. |
| 2015/0058861 A1 | 2/2015 | Zheng et al. |
| 2015/0071239 A1 | 3/2015 | Zhang et al. |
| 2015/0134970 A1 | 5/2015 | Jang et al. |
| 2015/0156095 A1 | 6/2015 | Lu |
| 2015/0208262 A1 | 7/2015 | Siomina |
| 2015/0229564 A1 | 8/2015 | Hong et al. |
| 2015/0280847 A1 | 10/2015 | Somasundaram et al. |
| 2015/0334664 A1 | 11/2015 | Sawai et al. |
| 2016/0007147 A1 | 1/2016 | Zhang et al. |
| 2016/0381600 A1 | 2/2016 | Aksu |
| 2016/0062242 A1 | 3/2016 | Hamaguchi et al. |
| 2016/0066242 A1 | 3/2016 | Su et al. |
| 2016/0073259 A1 | 3/2016 | Lee et al. |
| 2016/0128001 A1 | 5/2016 | Tsuda |
| 2016/0149622 A1 | 5/2016 | Ma |
| 2016/0150415 A1 | 5/2016 | Laneman et al. |
| 2016/0165066 A1 | 6/2016 | Yang et al. |
| 2016/0182134 A1 | 6/2016 | Kol et al. |
| 2016/0212031 A1* | 7/2016 | Jain ...................... H04L 43/0876 |
| 2016/0234746 A1 | 8/2016 | Gopal et al. |
| 2016/0330743 A1 | 11/2016 | Das et al. |
| 2017/0140073 A1 | 5/2017 | Chakraborty et al. |
| 2017/0155703 A1 | 6/2017 | Hao et al. |
| 2017/0208540 A1 | 7/2017 | Egner et al. |
| 2017/0295497 A1 | 10/2017 | MacMullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0318472 A1 | 11/2017 | Yu et al. |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2018/0343567 A1 | 11/2018 | Ashrafi |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0150182 A1 | 5/2019 | Koorapaty et al. |
| 2019/0182895 A1 | 6/2019 | Di Girolamo et al. |
| 2019/0222266 A1 | 7/2019 | Cui et al. |
| 2019/0230613 A1 | 7/2019 | Kim et al. |
| 2019/0239190 A1 | 8/2019 | Patel et al. |
| 2019/0296789 A1 | 9/2019 | Yu et al. |
| 2019/0319814 A1* | 10/2019 | Das ...................... H04L 43/08 |
| 2019/0320490 A1 | 10/2019 | Liu et al. |
| 2019/0349848 A1 | 11/2019 | Bali |
| 2019/0364435 A1 | 11/2019 | Ahmavaara |
| 2019/0364565 A1 | 11/2019 | Hmimy et al. |
| 2019/0393926 A1 | 12/2019 | Kakinada et al. |
| 2019/0394790 A1 | 12/2019 | Damnjanovic et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0084759 A1 | 3/2020 | Liu et al. |
| 2020/0092712 A1 | 3/2020 | Zhao et al. |
| 2020/0169339 A1 | 5/2020 | Patel et al. |
| 2020/0187150 A1 | 6/2020 | Eisner |
| 2020/0221392 A1 | 7/2020 | Xue et al. |
| 2020/0221518 A1 | 7/2020 | Schmitz et al. |
| 2020/0228993 A1 | 7/2020 | Gunasekara |
| 2020/0252933 A1 | 8/2020 | Hmimy et al. |
| 2020/0275457 A1 | 8/2020 | Hmimy |
| 2020/0344515 A1* | 10/2020 | Wong .................. H04N 21/2743 |
| 2021/0014693 A1 | 1/2021 | Syed et al. |
| 2021/0026711 A1 | 1/2021 | Ovadia et al. |
| 2021/0076223 A1 | 3/2021 | Taneja et al. |

(56) References Cited

U.S. PATENT DOCUMENTS

| | | |
|---|---|---|
| 2021/0076424 A1 | 3/2021 | Mukherjee et al. |
| 2021/0084658 A1 | 3/2021 | Sheriff et al. |
| 2021/0105633 A1 | 4/2021 | Vaidya et al. |
| 2021/0126662 A1 | 4/2021 | Solichien |
| 2021/0127423 A1 | 4/2021 | Park et al. |
| 2021/0185541 A1 | 6/2021 | Potharaju et al. |
| 2021/0211887 A1 | 7/2021 | Jones |
| 2021/0219303 A1 | 7/2021 | Khalid et al. |
| 2021/0227396 A1 | 7/2021 | Khalid et al. |
| 2021/0235495 A1 | 7/2021 | Xu et al. |
| 2021/0266914 A1 | 8/2021 | Yoo et al. |
| 2021/0274499 A1 | 9/2021 | Hmimy et al. |
| 2021/0297979 A1 | 9/2021 | Hmimy et al. |
| 2022/0007200 A1 | 1/2022 | Sevindik et al. |
| 2022/0007374 A1 | 1/2022 | Sevindik et al. |
| 2022/0078804 A1 | 3/2022 | Hmimy |

OTHER PUBLICATIONS

Palolam, et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

Souryal, Michael R., et al., "Effect of Federal Incumbent Activity on CBRS Commercial Service", International Symposium on Dynamic Spectrum Access Networks (DySPAN), IEEE 2019, 5 pages.

* cited by examiner

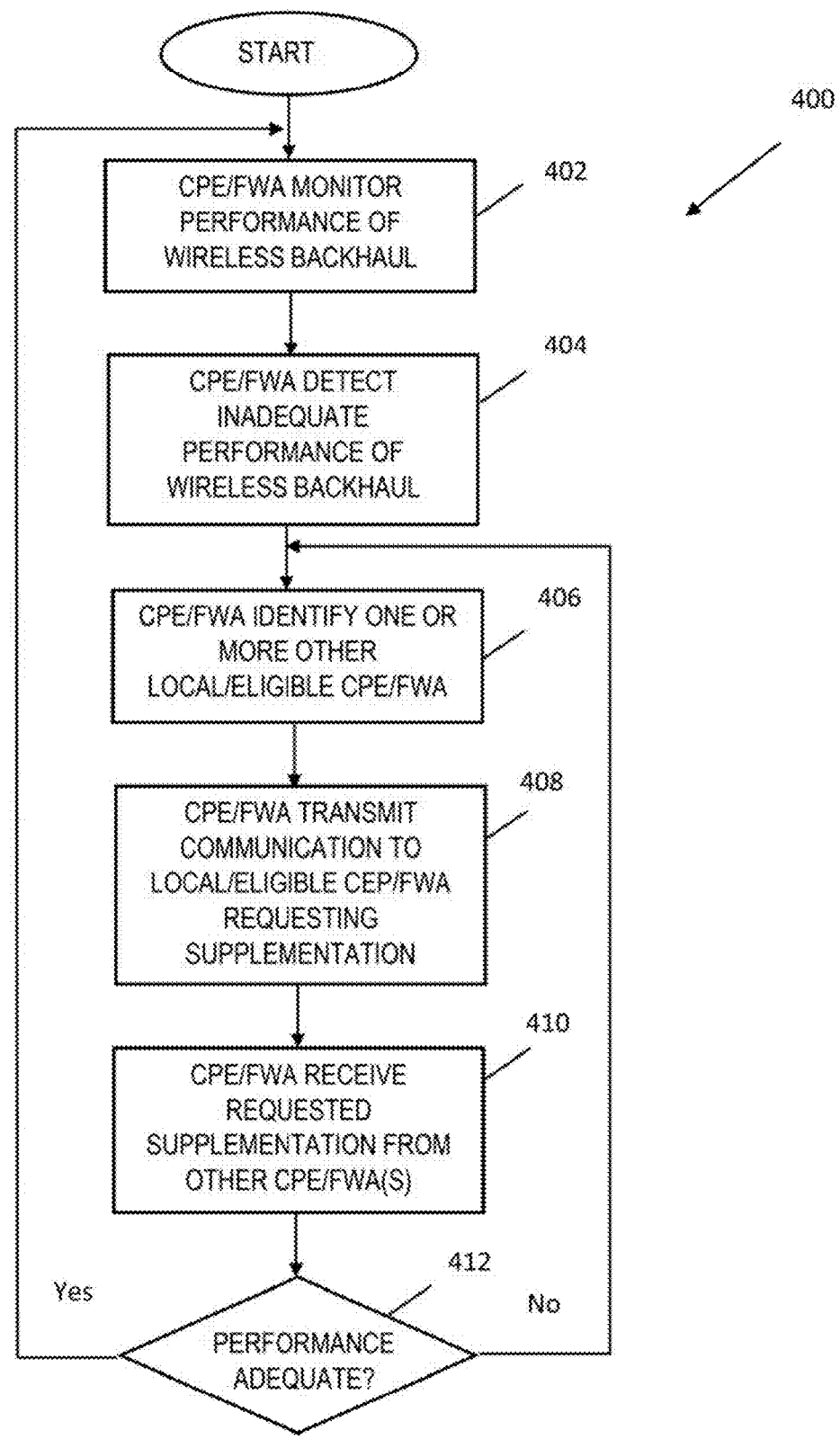

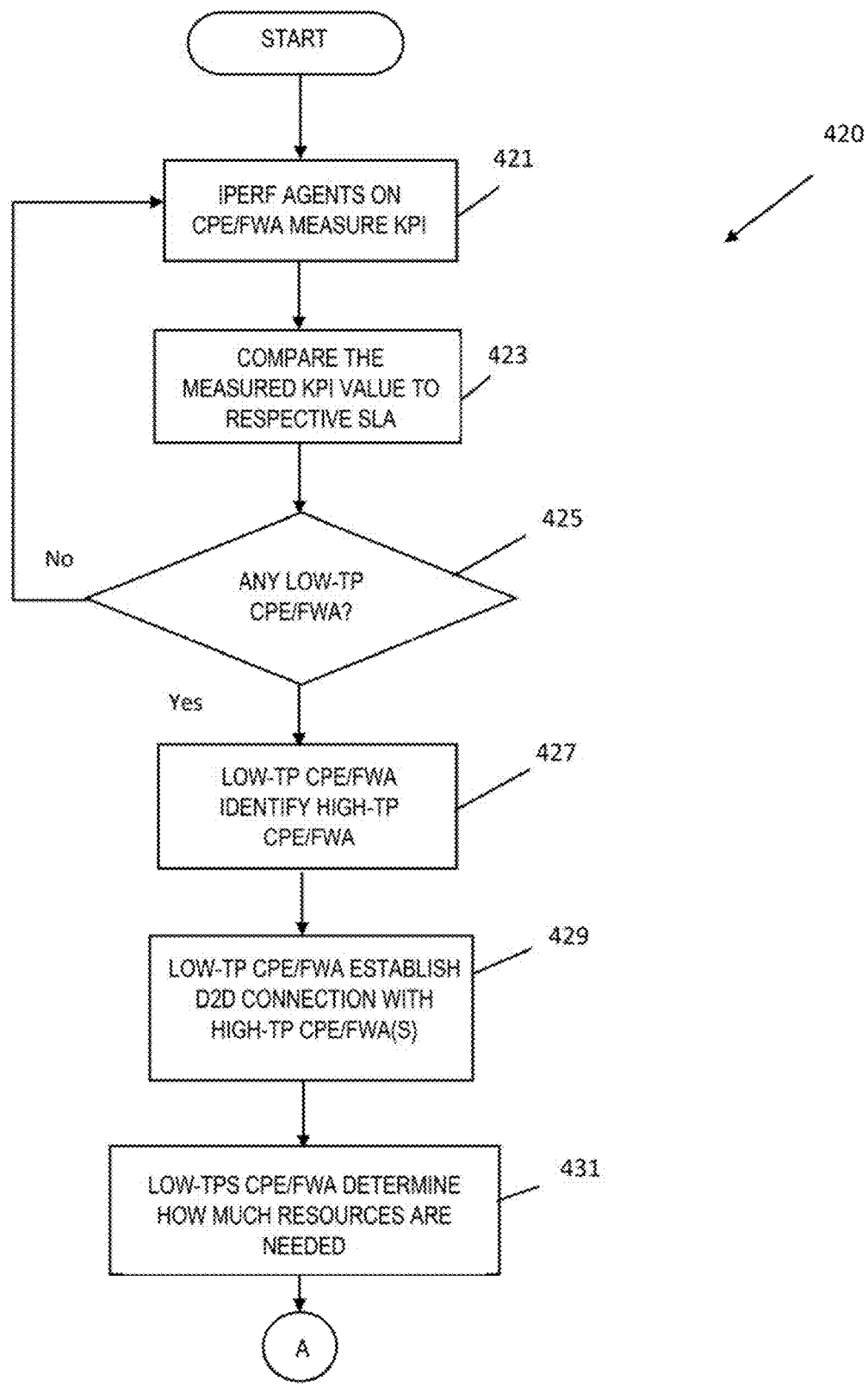

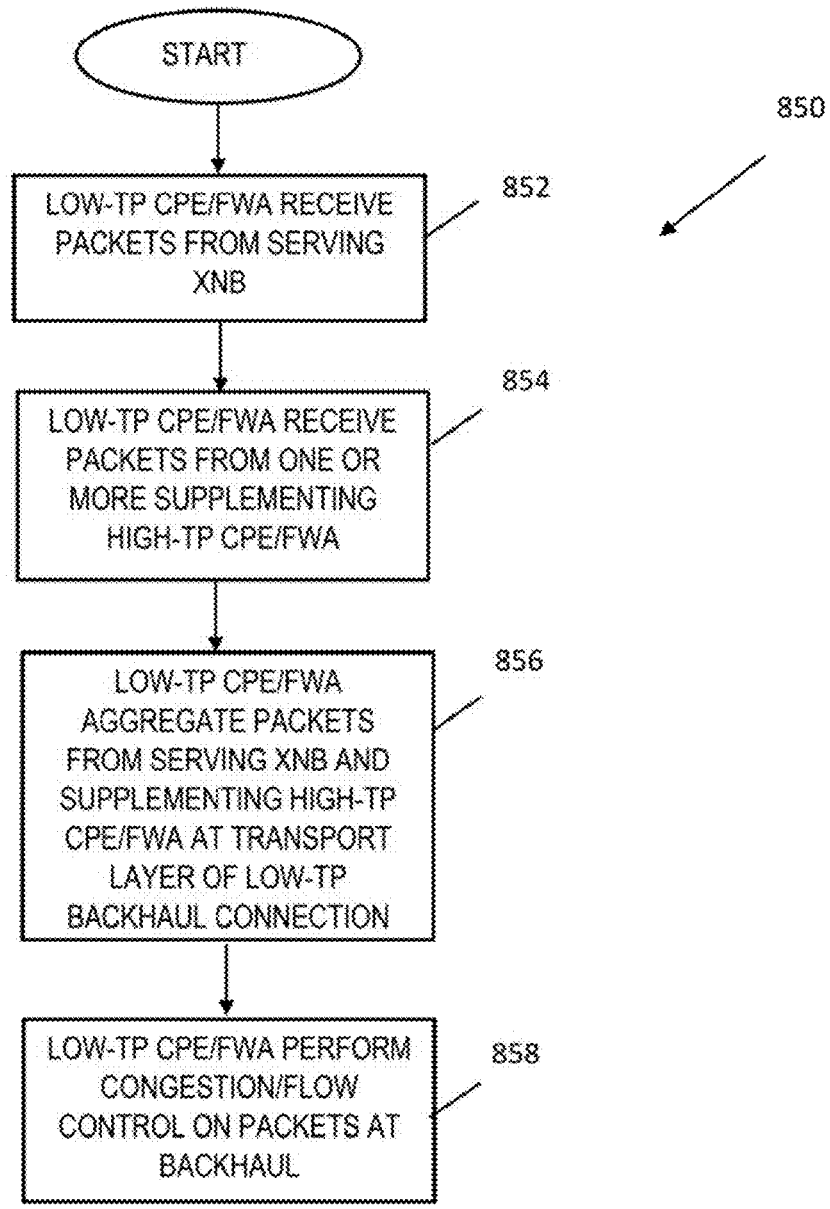

METHODS AND APPARATUS FOR ENHANCING COVERAGE IN QUASI-LICENSED WIRELESS SYSTEMS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for aggregating signals from multiple transmitter devices utilizing radio frequency spectrum to provide high-speed data services, such as for example those providing connectivity via technologies such as Citizens Broadband Radio Service (CBRS), LSA (Licensed Shared Access), TVWS, or Dynamic Spectrum Allocation (DSA).

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz–6.795 MHz | A | 6.78 MHz | Subject to local acceptance | Fixed service & mobile service |
| 13.553 MHz–13.567 MHz | B | 13.56 MHz | Worldwide | Fixed & mobile services except aeronautical mobile (R) service |
| 26.957 MHz–27.283 MHz | B | 27.12 MHz | Worldwide | Fixed & mobile service except aeronautical mobile service, CB radio |
| 40.66 MHz–40.7 MHz | B | 40.68 MHz | Worldwide | Fixed, mobile services & earth exploration-satellite service |
| 433.05 MHz–434.79 MHz | A | 433.92 MHz | only in Region 1, subject to local acceptance | amateur service & radiolocation service, additional apply the provisions of footnote 5.280 |
| 902 MHz–928 MHz | B | 915 MHz | Region 2 only (with some exceptions) | Fixed, mobile except aeronautical mobile & radiolocation service; in Region 2 additional amateur service |
| 2.4 GHz–2.5 GHz | B | 2.45 GHz | Worldwide | Fixed, mobile, radiolocation, amateur & amateur-satellite service |

TABLE 2-continued

| Frequency range | Type | Center frequency | Availability | Licensed users |
|---|---|---|---|---|
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider. Comparable technologies are in development, including for instance DSA, TVWS TV White Space), and LSA (Licensed Spectrum Access).

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2A.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

FIG. 2B illustrates a typical prior art CBRS-based CPE/FWA architecture 200 for a served premises (e.g., user residence), wherein the CPE/FWA 203 is backhauled by a base station (e.g., eNB) 201. A PoE (Power over Ethernet) injector system 204 is used to power the CPE/FWA 203 as well as provide Ethernet (packet0 connectivity for the CPE/FWA radio head to the home router 205.

Disabilities with CPE Coverage—

Extant CBRS architectures, while useful from many standpoints, currently lack mechanisms for providing the requisite data-rates to a given Consumer Premises Equipment (CPE) such as a premises Fixed Wireless Access (FWA) device that is at or near an edge of a cell coverage area (and accordingly which receives only comparatively weak downlink (DL) signals, and similarly is impaired in the uplink and UL), as is shown in FIG. 2C. In particular, in the typical CBRS network, there may be one or more CPE/FWA (i.e., House 3 shown in FIG. 2C) that are communicative with and served by a wireless network (e.g., one using CBRS spectrum), but are unable to meet established Service Level Agreement (SLA) performance requirements due to e.g., path loss and interference from the other cells. For such CPE, the Signal-to-Interference-plus-Noise (SINR) from the serving base station maybe low at the edge of the coverage area or cell 207, and hence they may not be able to meet their required DL SLA. Likewise, on the UL, the CPE/FWA is limited in its transmit power by FCC CBRS power limitations (see discussion of power limits supra), and hence its UL data rates will suffer as well due to path loss, etc. from being disposed at or near the cell edge and distant from the serving base station.

In the architecture 200 shown in FIG. 2C, the premises is also typically in a more remote area and/or not served by any alternate service provider capability of sufficient bandwidth (e.g., DOCSIS HFC cable drop, satellite dish, etc.) such that the use of the CBRS wireless backhaul shown is required.

One prospective cure to this problem (at least for the DL) is to simply raise base station transmitter EIRP. A base station such as 3GPP eNB or gNB is limited in data throughput and area coverage in an interference limited environment, due to the link budget limitations and the efficiency of the hardware components of its radio unit(s). To provide the requisite high level of performance (consistent with the aforementioned SLA) and greater coverage area, a single base station serving a CPE/FWA device has to transmit on comparatively higher power. However, such high power operation will violate the radio requirements (e.g., maximum transmit power and spectral masks) enforced in the 3GPP/CBRS specifications.

Technologies such as (i) use of a high device antenna gain; (ii) use of Multiple-Input-Multiple-Output (MIMO) system; (iii) Orthogonal Frequency Division Multiplexing (OFDM) (iv) advanced error control coding (e.g. Low Density Parity Check Codes (LDPC) or Turbo codes) are known in the prior arts to increase the throughput and coverage area. All of these techniques, while effective and implemented in typical 3GPP-based systems underlying CBRS, do not inherently mitigate the effects of the channel loss and interference, thereby effectively limiting the maximum data rates that can be achieved under such prior art approaches while operating within the aforementioned power limitations.

Hence, to achieve enhanced coverage area and throughput for systems such as those utilizing CBRS spectrum, improved apparatus and methods are needed. Such improved apparatus and methods would ideally support comparatively high levels of performance (e.g., data rates on both DL and UL) for "edge" CPE/FWA devices without large capital expenditures (CAPEX) to install e.g., additional base stations in the coverage area, and/or utilization of licensed spectrum with prospectively higher transmit power limits.

SUMMARY

The present disclosure addresses the foregoing needs by providing, inter alia, methods and apparatus for enhancing coverage area and data rates, for inter alia, served CPE such as FWA devices within a wireless network.

In a first aspect of the disclosure, a method of operating a fixed wireless access (FWA) device within a wireless network is disclosed. In one embodiment, the method includes: determining a deficiency in the operation of the FWA device; identifying at least one other FWA device capable of supplementing the operation of the FWA device; causing establishment of a wireless connection to the identified at least one other FWA device; and transacting data with the at least one other FWA device in order to remedy the deficiency.

In one variant, the determining a deficiency comprises determining that a data rate associated with the FWA device does not meet a prescribed service level agreement (SLA) requirement, the SLA between a subscriber of a network operator managing the wireless network and the network operator. In one implementation thereof, the method further includes: conducting, at the FWA device, an evaluation to determine an additional capacity that is required to be provided to the FWA device in order to meet or exceed the SLA; receiving data from respective ones of a plurality of other FWA devices, the received data indicating a respective additional capacity capability; and based at least on the received data and the determined additional capacity, selecting the at least one other FWA device from the plurality of other FWA devices with which to establish the wireless connection.

in another variant of the method, the identifying at least one other FWA device capable of supplementing the operation of the FWA device includes evaluating data regarding ones of a plurality of other FWA devices within wireless range of the FWA device.

In a further variant of the method, the FWA device is configured to operate within a frequency range between 3.550 and 3.70 GHz inclusive, and the causing establishment of a wireless connection to the identified at least one other FWA device comprises causing a request to be issued to a SAS (spectrum allocation system) in data communication with the wireless network to obtain at least one spectrum grant, at least one frequency within the at least one spectrum grant being utilized to establish the wireless connection. In one such implementation, the method further comprises: receiving at the FWA device data relating to the at least one spectrum grant from a base station within the wireless network, and utilizing the received data relating to the at least one spectrum grant in the establishment of the wireless connection.

In another such implementation, the method further includes: receiving at the FWA device data relating to the at least one spectrum grant from another FWA device within the wireless network, and utilizing the received data relating to the at least one spectrum grant in the establishment of the wireless connection.

In still another implementation, the causing a request to be issued to a SAS (spectrum allocation system) in data communication with the wireless network to obtain at least one spectrum grant comprises causing the request to be transmitted from the FWA device to the SAS via at least one other FWA device.

In a further implementation, the causing a request to be issued to a SAS (spectrum allocation system) in data communication with the wireless network to obtain at least one spectrum grant comprises causing the request to be initiated via at least one other FWA device.

In another aspect of the disclosure, computerized premises apparatus for use in a wireless network is disclosed. In one embodiment, the apparatus includes: at least one wireless interface; processor apparatus in data communication with the at least one wireless interface; and storage apparatus in data communication with the processor apparatus, the storage apparatus comprising at least one computer program.

In one variant, the at least one computer program is configured to, when executed by the processor apparatus: utilize the at least one wireless interface to obtain first data relating to a performance or capability of a wireless connection with at least one base station in wireless range of the at least one wireless interface of the computerized premises apparatus; cause communication with at least one fixed wireless access (FWA) device within wireless range of the computerized premises device to request supplementation of the wireless connection; obtain second data from the at least one FWA device enabling establishment of at least a second wireless connection, the second wireless connection between the computerized premises apparatus and the at least one FWA device; and based at least on the obtained second data, cause establishment of the at least second wireless connection.

In one implementation, the computerized premises apparatus comprises a FWA (fixed wireless access) device configured to operate in a CBRS (citizens broadband radio service) frequency band, and the at least one base station comprises a 3GPP-compliant gNodeB (gNB) configured to operate in the same CBRS frequency band.

In another implementation, the at least one computer program is further configured to, when executed by the processor apparatus: utilize the obtained first data to determine that the first connection cannot meet a prescribed performance level requirement associated with the computerized premises apparatus; and based at least on the determination, cause said communication with the at least one fixed wireless access (FWA) device within wireless range of the computerized premises device to request supplementation of the wireless connection, the communication to request supplementation comprising third data relating to an amount of bandwidth supplementation required by the computerized premises apparatus.

In one such configuration, the utilization of the obtained first data to determine that the first connection cannot meet a prescribed performance level requirement associated with the computerized premises apparatus comprises determination of the amount.

In another embodiment, the computerized premises apparatus includes at least one computer program configured to, when executed by the processor apparatus: utilize the at least one wireless interface to receive data relating to a request from another computerized premises apparatus for a wireless connection between the computerized premises apparatus and the another computerized premises apparatus; determine an amount of wireless bandwidth that the computerized premises apparatus can provide via the requested wireless connection; and perform at least one of: (i) determining whether to establish the wireless connection based at least on the received data and the determined amount of wireless bandwidth; or (ii) communicate second data to the another computerized premises apparatus, the second data relating to the determined amount of wireless bandwidth, the second data enabling the another computerized premises apparatus to determine whether to establish the requested wireless connection.

In one variant, the determination of the amount of wireless bandwidth that the computerized premises apparatus can provide via the requested wireless connection comprises evaluation of a second wireless connection between the at least one wireless interface of computerized premises apparatus and a base station of a managed wireless network, the evaluation comprising measurement of at least one actual performance metric relating to the second wireless connection.

In one such implementation, the computerized premises apparatus comprises a FWA device configured to operate in a CBRS (citizens broadband radio service) frequency band, and the base station comprises a 3GPP-compliant gNodeB (gNB) configured to operate in the same CBRS frequency band; and the second wireless connection comprises operation in an RRC_Connected state.

In another such implementation, the measurement of at least one actual performance metric relating to the second wireless connection comprises use of an application computer program operative to execute on the computerized premises apparatus, the application computer program configured to measure at least one of Transmission Control Protocol (TCP) packet performance or User Datagram Protocol (UDP) packet performance.

In another variant, the computerized premises apparatus is further configured to generate at least one message relating to a request for a spectrum allocation for use in establishing the second wireless connection.

In one implementation, the computerized premises apparatus is further configured to establish a communication session with at least one computerized process within a managed wireless network serving the computerized premises apparatus, the communication session configured to enable transmission of the generated at least one message for forwarding to a computerized spectrum allocation process. It is also configured to receive at least one message from the at least one computerized process, the received at least one message comprising data relating to the spectrum grant; and utilize at least the received at least one message to establish the second wireless connection.

In another aspect of the disclosure, a method of operating a wireless network infrastructure is disclosed. In one embodiment, the method includes using one or more "relay" CPE to supplement (limited) data bandwidth provided to a target CPE.

In yet another aspect of the disclosure, a method of dynamically supplementing a CPE in a wireless network infrastructure with additional capacity is disclosed. In one embodiment, the method includes using one or more "relay" CPE to supplement (limited) data bandwidth provided to a target CPE disposed at or near a cell edge and having deficient wireless bandwidth via a request-grant procedure.

In an additional aspect of the disclosure, computer readable apparatus is described. In one embodiment, the apparatus includes a storage medium configured to store one or more computer programs, such as on a fixed wireless receiver of a managed wireless network. In one embodiment, the apparatus includes a program memory or HDD or SDD and stores one or more computer programs supporting relaying of data from a serving base station and the recipient fixed wireless receiver via one or more other fixed wireless receivers.

In another aspect, methods and apparatus for communication coordination for delivery/receipt of wireless signals to/from one or more target CPE are disclosed. In one embodiment, the communication coordination comprises data messaging between the one or more serving CPE and the first target CPE such that the signals associated with one or more serving CPE may be used to provide services to the first target CPE.

In yet a further aspect, improved proximity-based methods and apparatus useful within e.g., a quasi-licensed wireless system are disclosed.

In another aspect, methods and apparatus useful within e.g., a quasi-licensed wireless system for providing packet aggregation and splitting in support of multiple physical bearers are disclosed.

In still a further aspect, methods and apparatus useful within e.g., a quasi-licensed wireless system for providing device to device (D2D) communication in support of relay or supplementation functions are disclosed.

These and other aspects shall become apparent when considered in light of the disclosure provided herein.

BRIEF DESCRIPTION OF THE DRAWINGS

FIG. 4 is a logical flow diagram illustrating one embodiment of a generalized method of operating a CPE/FWA (e.g., Low-TP or Low-Throughput CPE/FWA) to obtain "relay" supplementation from one or more other CPE/FWA, according to the present disclosure.

FIGS. 4A and 4B illustrate a logical flow diagram of an exemplary implementation of the generalized method of FIG. 4 according to the present disclosure, including use of performance monitoring software agents (e.g., iPerf applications).

FIG. 8B is a logical flow diagram illustrating one embodiment of a method of aggregating multi-sourced packet data within a supplemented CPE/FWA according to the present disclosure.

FIGS. 1-5B and 7-12 ©Copyright 2019 Charter Communications Operating, LLC. All rights reserved.

DETAILED DESCRIPTION

Figure 1:
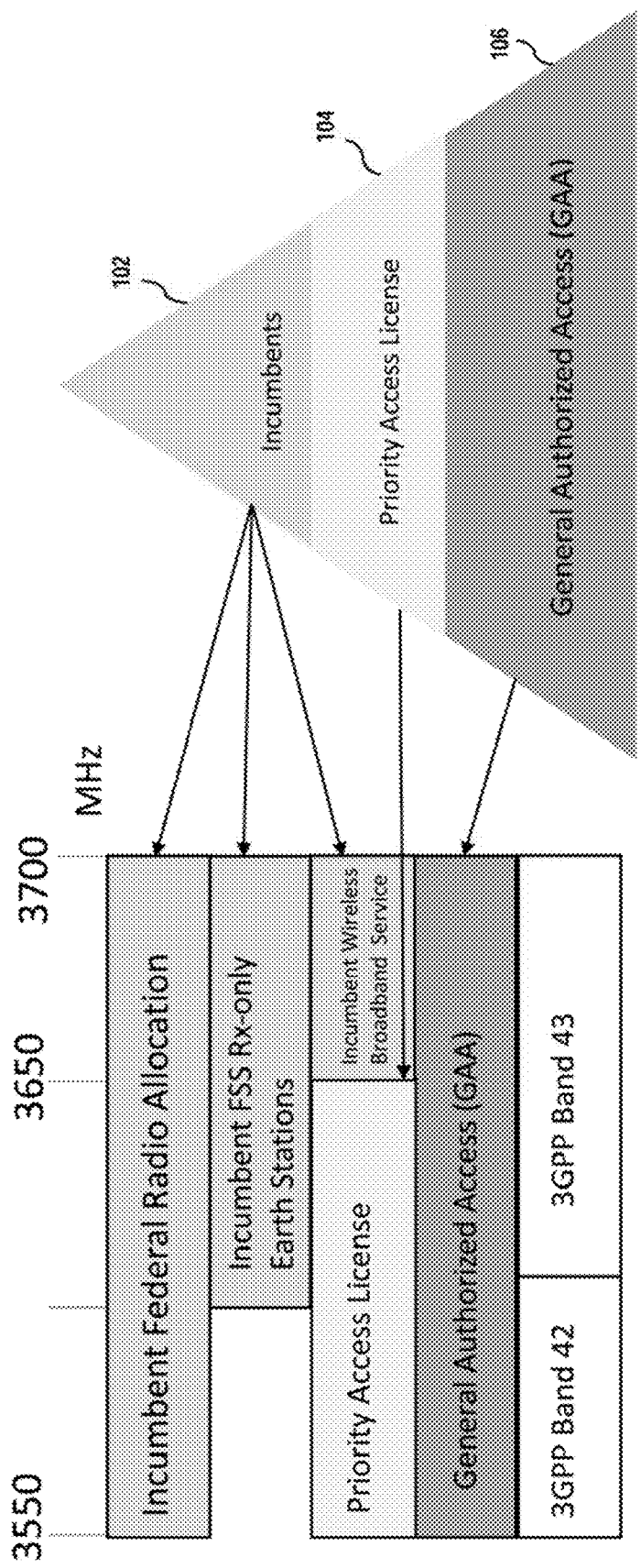
FIG. 1 is a graphical illustration of prior art CBRS (Citizens Broadband Radio Service) users and their relationship to allocated frequency spectrum in the 3.550 to 3.700 GHz band.

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a FWA/CPE or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides methods and apparatus for enhancing wireless coverage area and data rates to served user devices (e.g., fixed wireless consumer premises equipment or CPE) via relaying through one or more other CPE.

In one embodiment, the CPE all utilize "quasi-licensed" spectrum provided by the recent CBRS technology initiative via 3GPP-based infrastructure and protocols. I One or more "in-coverage" CPE (i.e., those with sufficiently strong signals and data rates) are used as relays to provide requisite data rates to CPE that are at the edge of coverage of their servicing network (or are otherwise prevented from obtaining or establishing sufficiently strong signal, such as via topological obstructions or other such phenomena), and accordingly cannot meet user experience or service level agreement (SLA) requirements. In one variant, the participating or eligible CPE within the network have processes operative thereon (e.g., "iperf" agents) that can measure key performance metrics or indicators (KPIs) such as data throughput (TP), latency, jitter, or BER. Participating CPE that, e.g., can sustain data rates higher than required by their own SLAs or requirements, can act as the relays for other under-performing CPE, such that all the CPE can meet their performance requirements simultaneously.

In one implementation, the under-performing or "secondary" CPE can search for and acquire in-coverage or over-performing CPE (aka "primary" CPE), and establishes one or more Device-to-Device (D2D) connections to these primary CPE in order to supplement signal being received by the secondary CPE directly from its serving base station (e.g., 3GPP eNB or gNB operating as a CBRS CBSD). Once the connection(s) is/are established, the secondary CPE can receive/transmit data from/to the participating primary CPEs. In one configuration, CBRS GAA and/or PAL spectrum is allocated to the primary and secondary CPE (such as by a request to a SAS) in order to support the additional D2D connection(s).

The exemplary embodiment described above improves, inter alia, coverage area due to the gain and spatial diversity provided via relaying, without the need to use excessively large power at the serving transmitter (e.g., gNB/CBSD).

In addition, the provision of enhanced signal quality in both uplink (UL) and downlink (DL) directions for the secondary CPE at the cell edge via relaying increases the network capacity without the need to install additional infrastructure such as CBSDs and associated backhaul, thereby effectively adding more customers to the network with a given CAPEX (capital expenditure).

The methods and apparatus described herein may also advantageously be extended to other shared-access architectures (i.e., other than CBRS) such as for example DSA, LSA, and TVWS systems.

Detailed Description of Exemplary Embodiments

Exemplary embodiments of the apparatus and methods of the present disclosure are now described in detail. While these exemplary embodiments are described in the context of the previously mentioned base station (e.g., gNB) wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Moreover, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Relaying Architecture—

Figure 2:
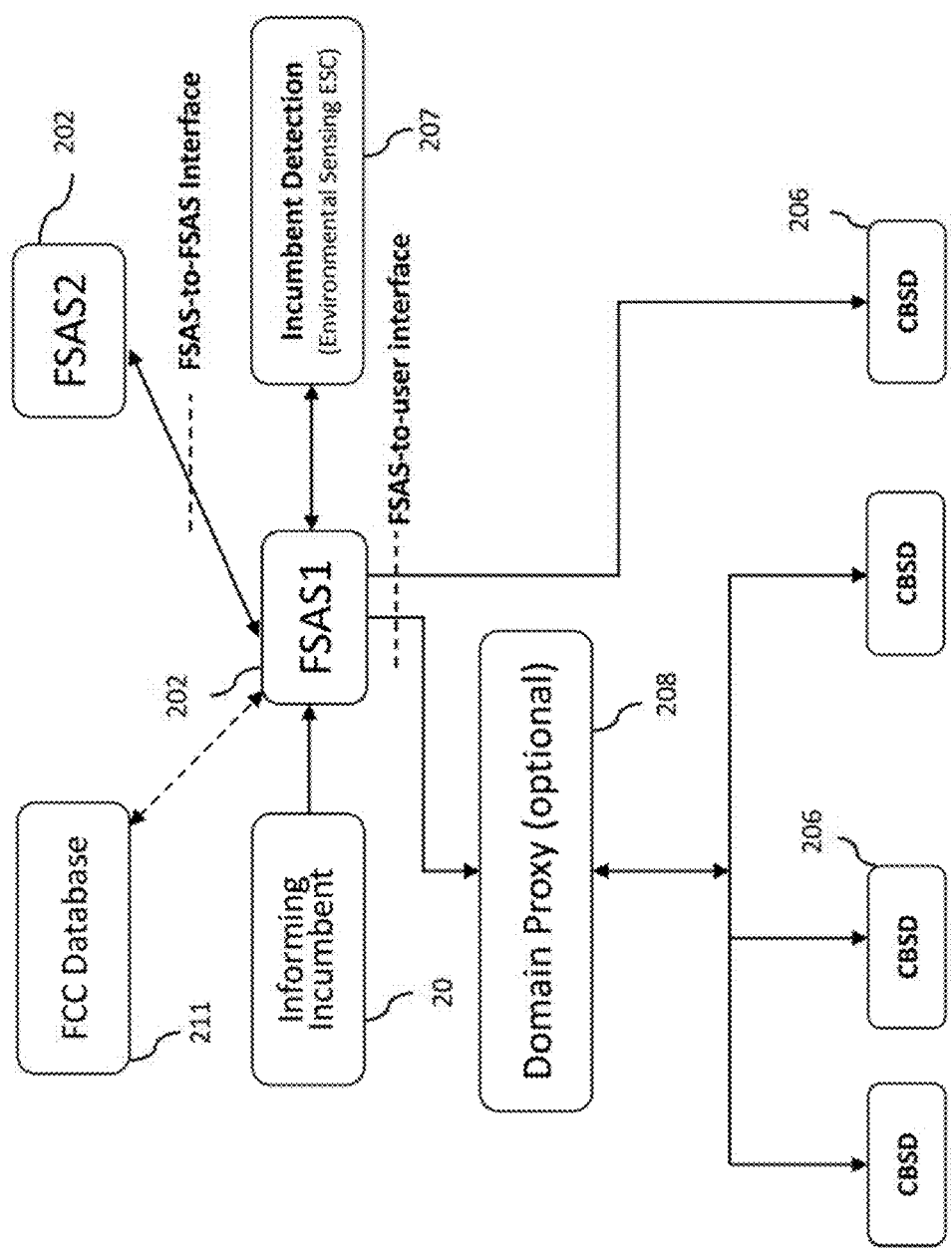
FIG. 2 is a block diagram illustrating a general architecture for the CBRS system of the prior art.
Figure 2A:
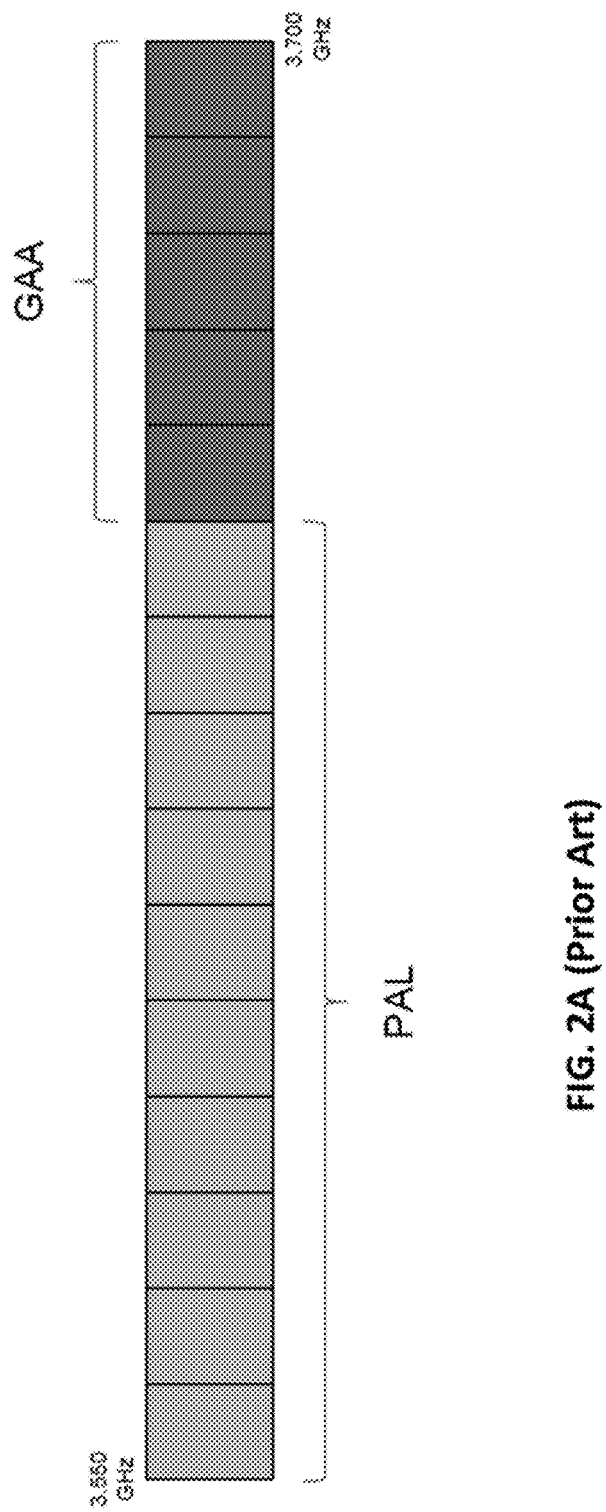
FIG. 2A is a graphical representation of allocations for PAL versus GAA users within the frequency band of FIG. 2.
Figure 2B:
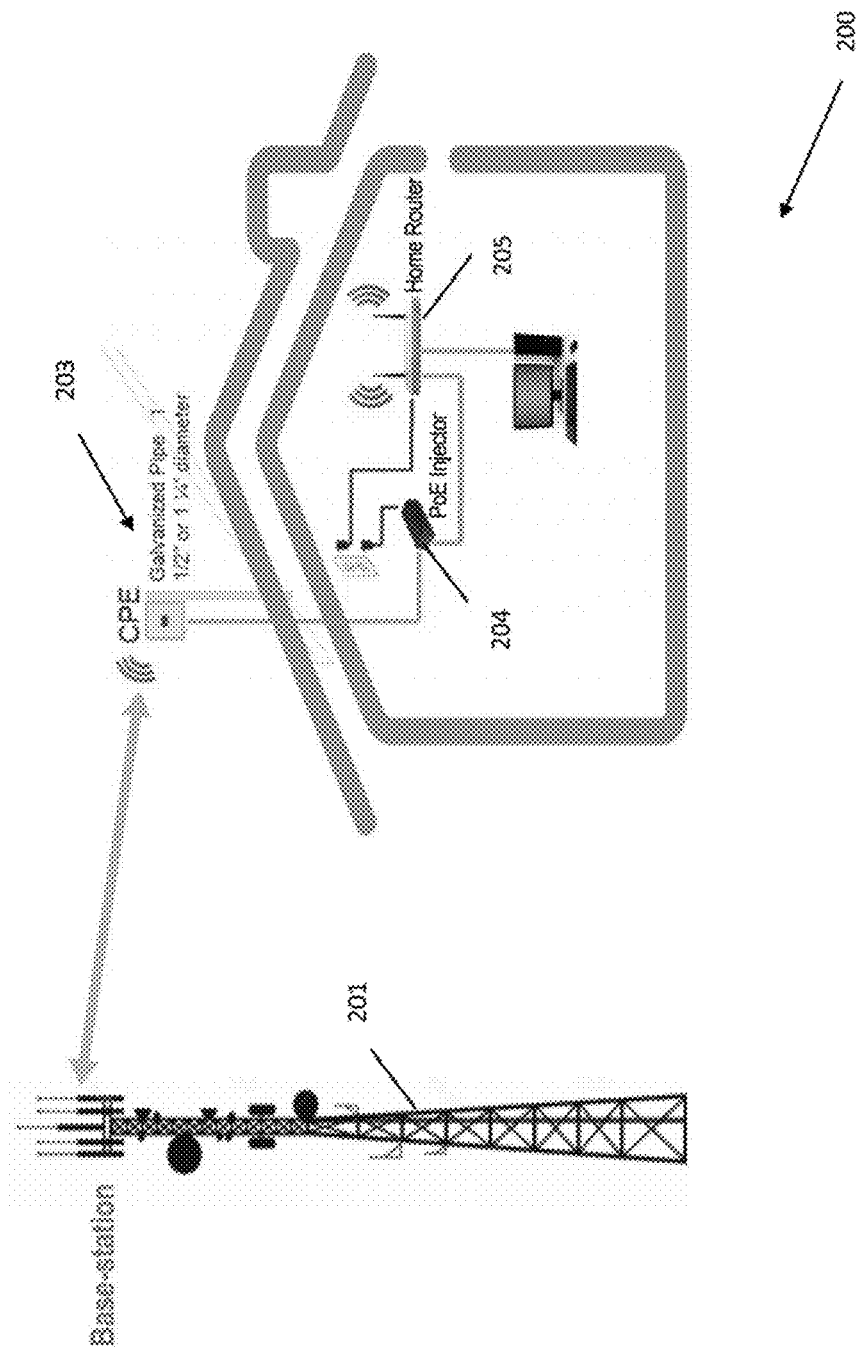
FIG. 2B is a graphical illustration of a prior art configuration for delivery of data from a base station to an end-user device (CPE/FWA) within the wireless coverage areas of the base station.
Figure 2C:
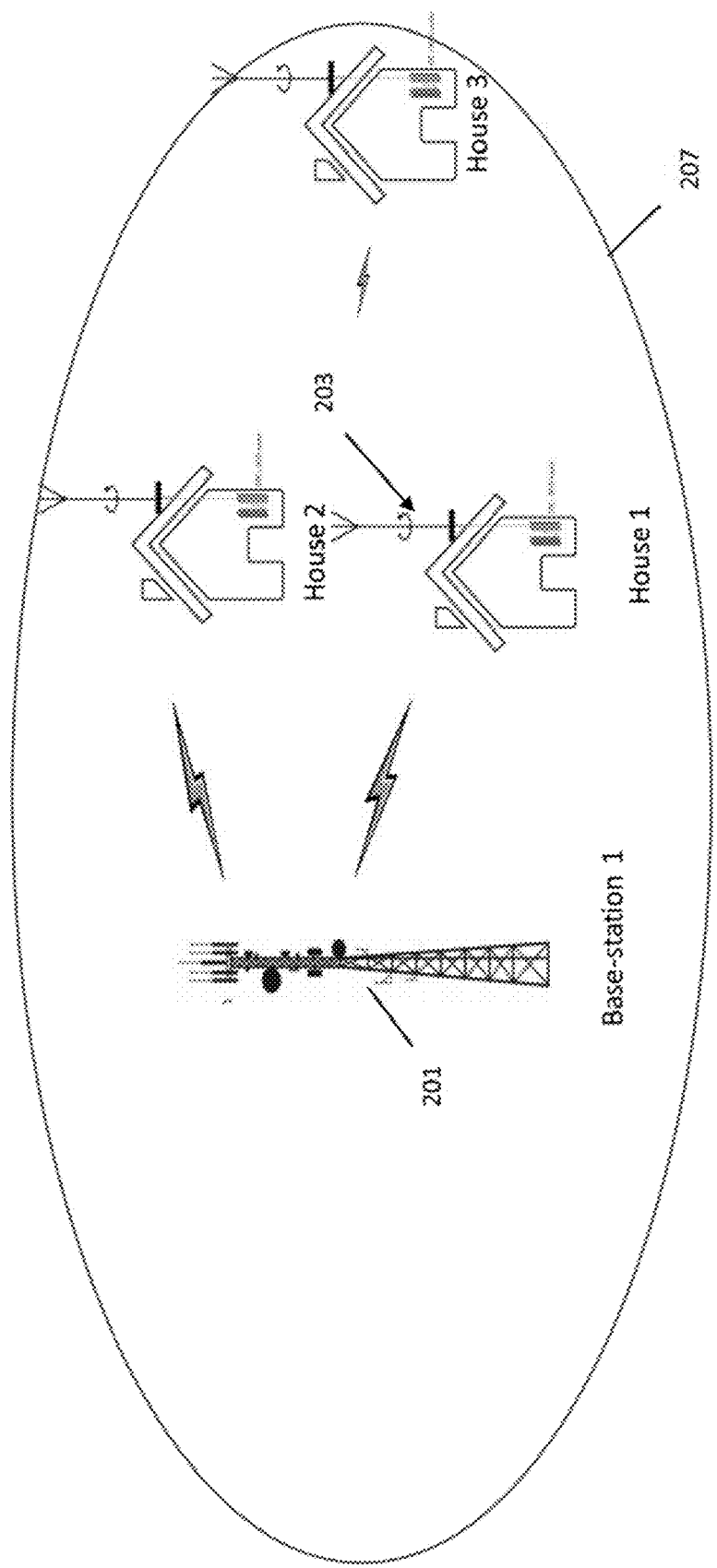
FIG. 2C is a graphical illustration of a prior art configuration for delivery of data from a base station to several end-user devices (CPE/FWA) within the wireless coverage areas of the base station, including an exemplary premises (House 3) disposed at or near the cell edge.
Figure 3A:
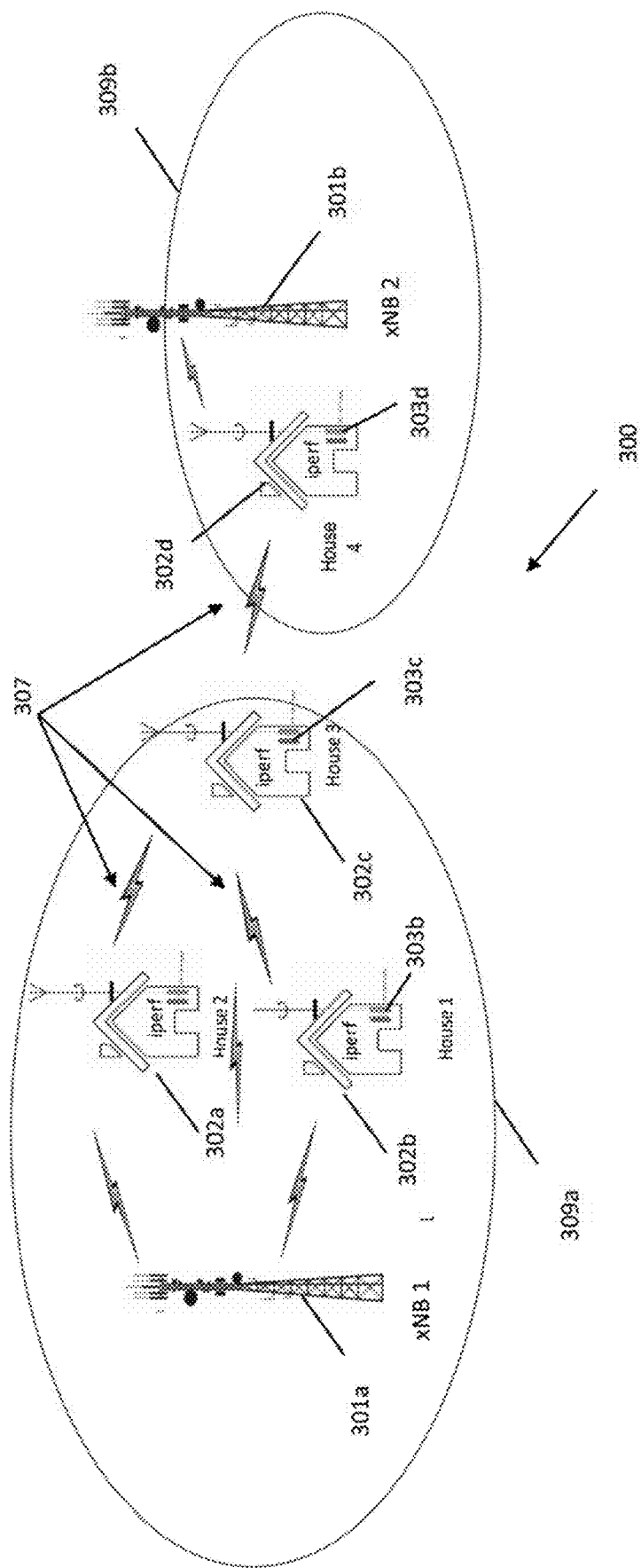
FIG. 3A is a graphical illustration of an exemplary configuration for enhancing coverage area for an "edge" CPE/FWA according to one embodiment of the present disclosure.
Figure 3B:
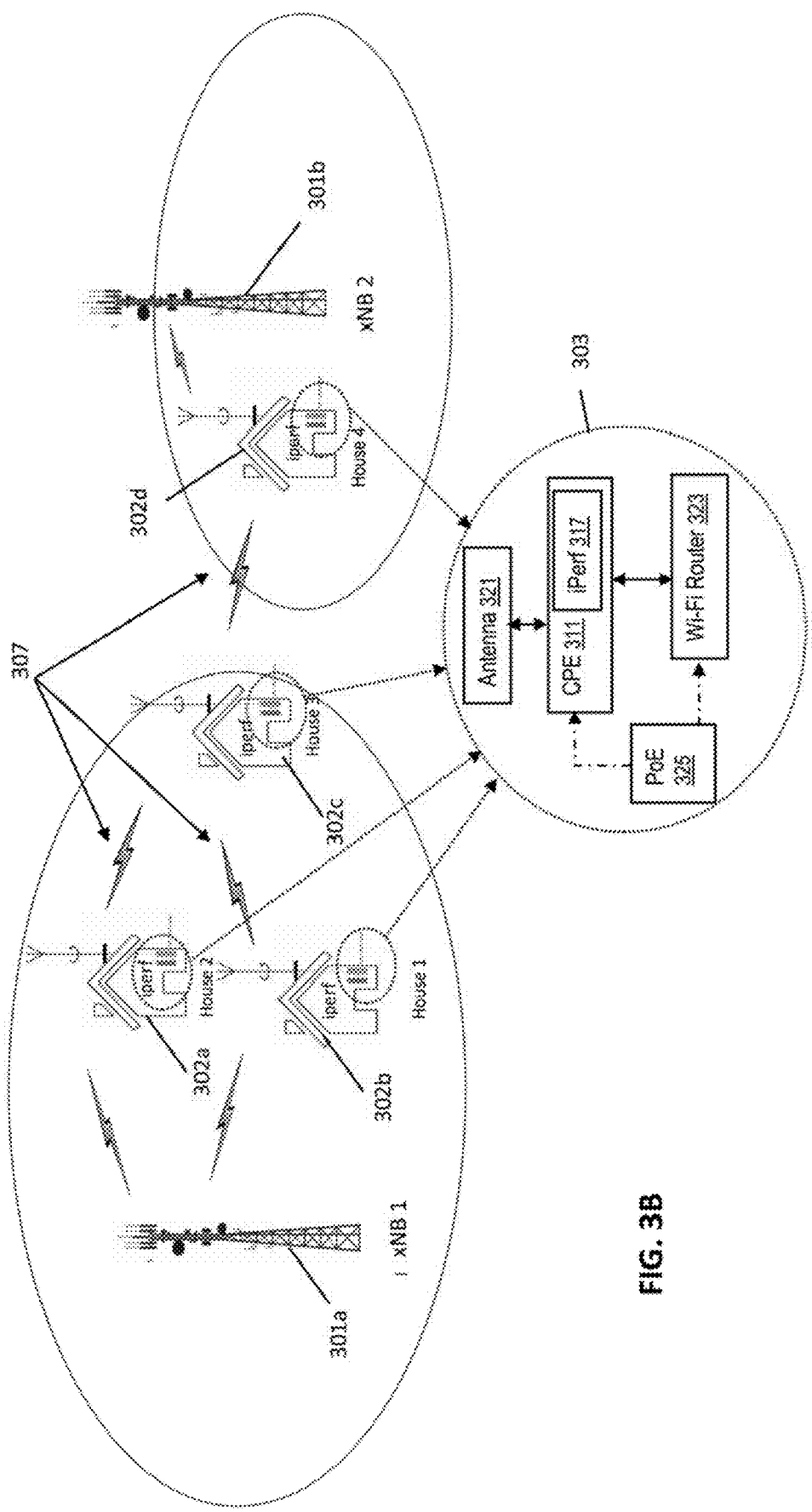
FIG. 3B shows the exemplary configuration for enhancing coverage area for an "edge" CPE/FWA of FIG. 3A, with detail of the CPE/FWA components of each premises.

FIGS. 3A and 3B are block diagrams illustrating an exemplary embodiment of a fixed wireless configuration with relaying functionality utilizing CBRS frequency bands according to the present disclosure. As shown, the configuration 300 includes one or more xNB's 301a, 301b (e.g., 3GPP eNBs or gNBs), several "in-coverage" premises or houses 302a, 302b, 302d, and one "out-of-coverage" house 302c. The houses 302a-d are each equipped with respective CPE/FWA apparatus 303a-d, each of the latter comprising CPE devices 3110, Wi-Fi or other routers 323, PoE apparatus 325 (such as in the architecture of FIG. 2B discussed above), one or more antenna elements 321, and performance monitoring (e.g., "iPerf" or other performance assessment logic or software) agents 317. Each CPE/FWA also includes D2D and packet networking functions as described subsequently herein (not shown in FIGS. 3A-3B for simplicity).

As discussed in greater detail below, in the exemplary embodiment, the iPerf agent at each house measures key performance indicators (KPIs) such as data throughput (TP), latency and jitter, which are useful in assessing the needs and capabilities of each individual premises. Deficient or sub-SLA performing CPE/FWA (such as that 303c associated with House 3 302c in the illustration of FIGS. 3A-3B, by virtue of its location at or near the edge of the serving cell 309a, and also being out of range of other cells 309b) are accordingly suitable candidates for relaying or supplementation of their data service by other CPE/FWA 303a, 303b, 303d, whether within the same cell 309a or not.

It will be appreciated that the use of exemplary performance measurement (e.g., iPerf) processes at the various CPE/FWA devices advantageously allows for a very low-overhead and efficient mechanism by which to judge whether a given CPE/FWA is (i) deficient in terms of meeting one or more criteria relating to e.g., its SLA, and/or (ii) can sustain provision of relay or supplementation services to one or more other CPE/FWA. Specifically, using a performance-based mechanism such as iPerf in the exemplary embodiments obviates more sophisticated analyses of channel conditions such as link budgets/path loss estimates, channel parameter measurement such as RSSI or RSSQ, determination of PER or BER, etc. Rather, the net or actual performance of any given link and its associated channel conditions at any given time are readily determined and used as a basis of determining whether supplementation is required.

For instance, if House 1 302*a* has an SLA (service level agreement) requirement of 35/4 Mbps (DL/UL), House 2 302*b* has an SLA of 40/6 Mbps (DL/UL), and House 3 302*c* has an SLA of 25/3 Mbps (DL/UL), each house will require actual performance (data throughput or TP as determined by its iPerf client) that at least meets the foregoing requirements. As such, if say House 3 302*c* can only achieve 75% of its SLA on the DL, and say 90% of its SLA on the UL, then its performance is deficient or sub-SLA, and House 3 is considered to be "out-of-coverage" and require supplementation. As shown in FIG. 3A, House 3 is not completely outside the footprint of the service cell in this example (in a geographic sense), but for purposes of determining its performance level relative to the prevailing SLA, it is deficient and hence categorized as such.

It will be appreciated that while the foregoing "in/out" of coverage model is effectively binary in nature (i.e., deficient in one or more aspects or not), the present disclosure also contemplates more gradient or progressive categorization models or structures, such as where CPE/FWA are ranked or rated against their SLA (e.g., individually for each of DL and UL), and a score given that indicates their proximity to falling below the relevant SLA. For instance, in one such approach, a given CPE/FWA 303 may be rated as "at risk" for scoring below a prescribed threshold on its DL or UL relative to its SLA. As the margin to the SLA criterion is approached, the risk-level or degree of "precariousness" for the CPE/FWA is increased, and hence this data may be used in certain embodiments to prioritize between CPE/FWA to supplement (e.g., an order in which limited supplementation resources are allocated within the MSO wireless infrastructure). It may also be utilized to structure polling or operation of the performance monitoring algorithms; i.e., more at-risk CPE/FWA may be configured to be more proactive or diligent in monitoring their performance relative to their SLA (e.g., execute iPerf more frequently) so as to more timely detect any transgressions thereof and address them with supplementation.

Such scoring or risk assessment may also be temporally correlated, such as based on data indicative of certain times of the day or certain days or the week or months of the year (or correlation with certain events such as sporting events, sunspots, military exercises, use of weather radar, etc.) when higher interference may be present, such that supplementation is more actively monitored/polled at such times. Note also that SLAs may be constructed to vary temporally and/or on an event-driven basis, and as such the present disclosure contemplates such variations being accounted for in the logic performance monitoring client (e.g., iPerf) such that the SLA is a "moving target" against which the performance is assessed based on a function of time/event.

Moreover, it will be recognized that the UL and DL aspects of performance may be weighted or treated heterogeneously if desired. For instance, "at risk" categorization of UL bandwidth performance may have a different score or proximity index than DL for a given CPE/FWA, since for example DL performance (or lack thereof) may be a more critical determinant of user service quality or experience (e.g., a slow file upload may be much less troublesome to a user than an intermittent or choppy video streaming experience). Note that this type of analysis may also be applied on a per-user/per-premises basis if desired. For example, the present disclosure contemplates scenarios where a given user may describe or specify various aspects of their SLA/performance which are most critical to them, and the scoring/monitoring/polling/supplementation aspects described above algorithmically adjusted based thereon such that the behavior of each CPE/FWA is "tuned" to that particular user or premises. For instance, where a premises uses very little UL capacity, its CPE./FWA behavior may be much more heavily weighted to the DL aspects of its SLA. FIG. 3B illustrates the fixed wireless configuration with relaying functionality utilizing CBS frequency band of FIG. 3A, further showing the constituent components of each CPE/FWA 303 according to one embodiment of the present disclosure. As shown (and subsequently described in greater detail herein), each CPE/FWA 303 includes a performance monitoring client which enables in effect stand-alone assessment of its own performance relative to its particular SLA (which may not be the same for each of the CPE/houses shown, depending on contractual agreements, physical limitation of the installation, etc.). As such, each CPE/FWA in this embodiment can both assess itself relative to its own SLA, and "advertise itself" (whether actively, such as via request or advertisement messaging) as either needing supplementation from other CPE/FWA local to it, or being able to provide supplementation to other low-TP CPE/FWA devices.

As previously noted, one primary attribute of the disclosure relates to its ability to enhance coverage and data rates. Specifically, to increase the amount of signal power received by the "out-of-network" coverage CPE/FWA (and thereby enhance its data rate), the CPE/FWA may receive the signal from multiple in-coverage or supplementing CPE/FWA. It will be appreciated that depending on the type of antenna elements 321 used in each CPE/FWA (e.g., directional or omni-directional), even a high-TP CPE/FWA 303*a*, 303*b* (FIG. 3A) may not be able to supplement a low-TP CPE/FWA 303*c* if the antenna geometry of the supplementing (and receiving) devices does not support it, such as where highly directional antenna elements are utilized on one or both CPE/FWA and they are aligned to their serving xNB versus the other CPE/FWA.

Hence, in one implementation, the CPE/FWA may also have "smart" antenna capability that can steer the radiation pattern (e.g., lobes) toward the desired target CPE/FWA or serving base station 301 to maximize e.g., the received SINR. This steering may be accomplished via mechanical means (e.g., actually moving the antenna element or array in azimuth and/or elevation/tilt), and/or electronic steering means such as beamforming (e.g., as may be used in LTE) or so-called "massive MIMO" in 5G NR technology).

In one such implementation, a directional or steerable device such as the BLiNQ SC-300S dynamic device manufactured by BLiNQ Networks Corporation is used, which includes software-enabled targeting of specific areas to enable efficient coverage.

In another such implementation, each CPE/FWA employing multiple directional antenna element technology measures the received signal from its associated base station or another CPE/FWA in communication therewith (e.g., via D2D mechanisms such as ProSe described subsequently herein), and extracts multipath wireless channel information relating to phase and amplitude from the received signal. Such information is used to combine the output of the multiple antennas in such a way as to form a narrow sectorized beam towards the target base station or another CPE/FWA as appropriate, including as input to any mechanical steering mechanism (e.g., to change azimuth of the element/array). Various other similar approaches for optimizing SINR or other signal-strength related parameters will be recognized by those of ordinary skill when given the present disclosure.

Methodology—

Figure 4B:
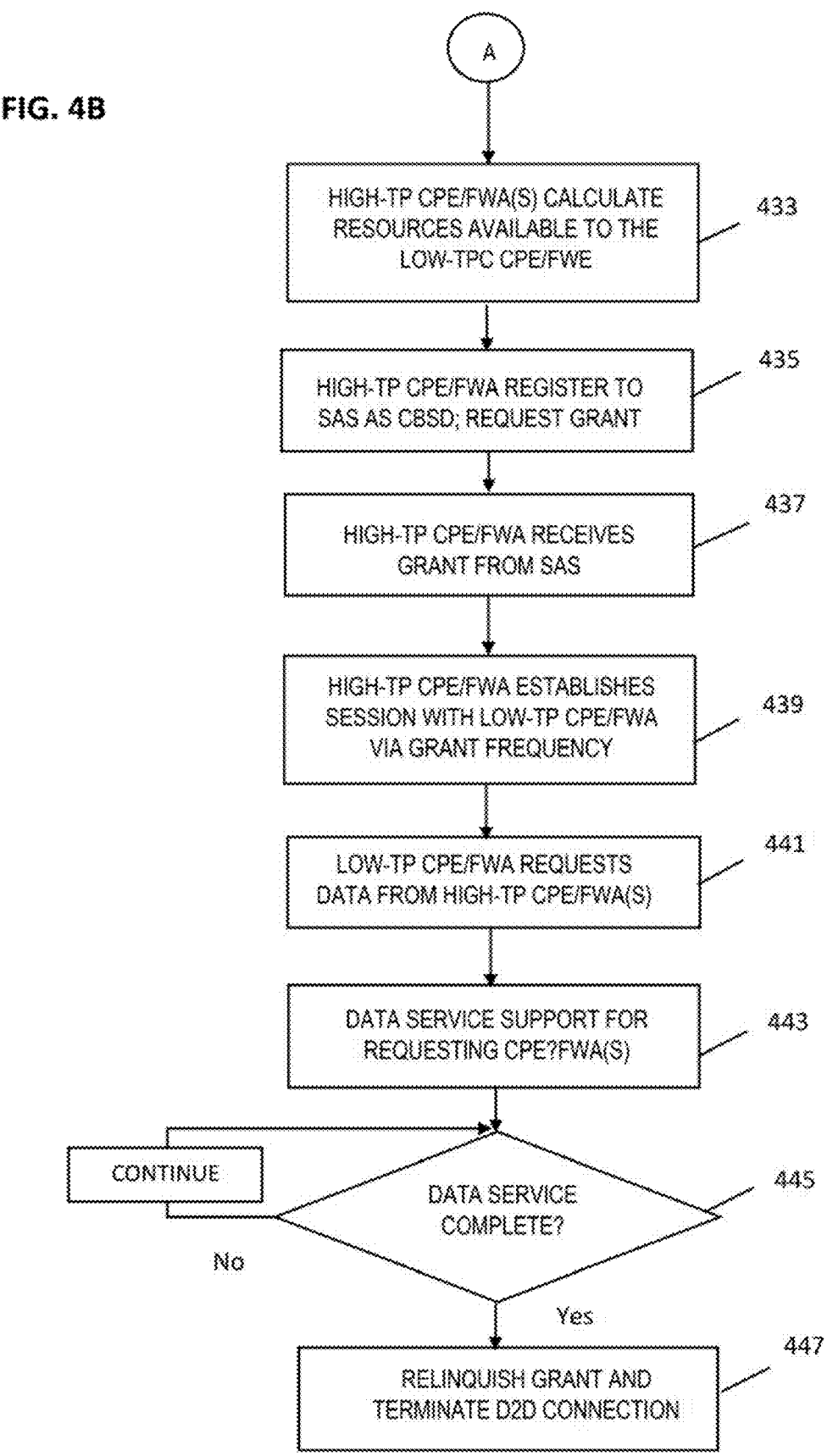
Figure 5A:
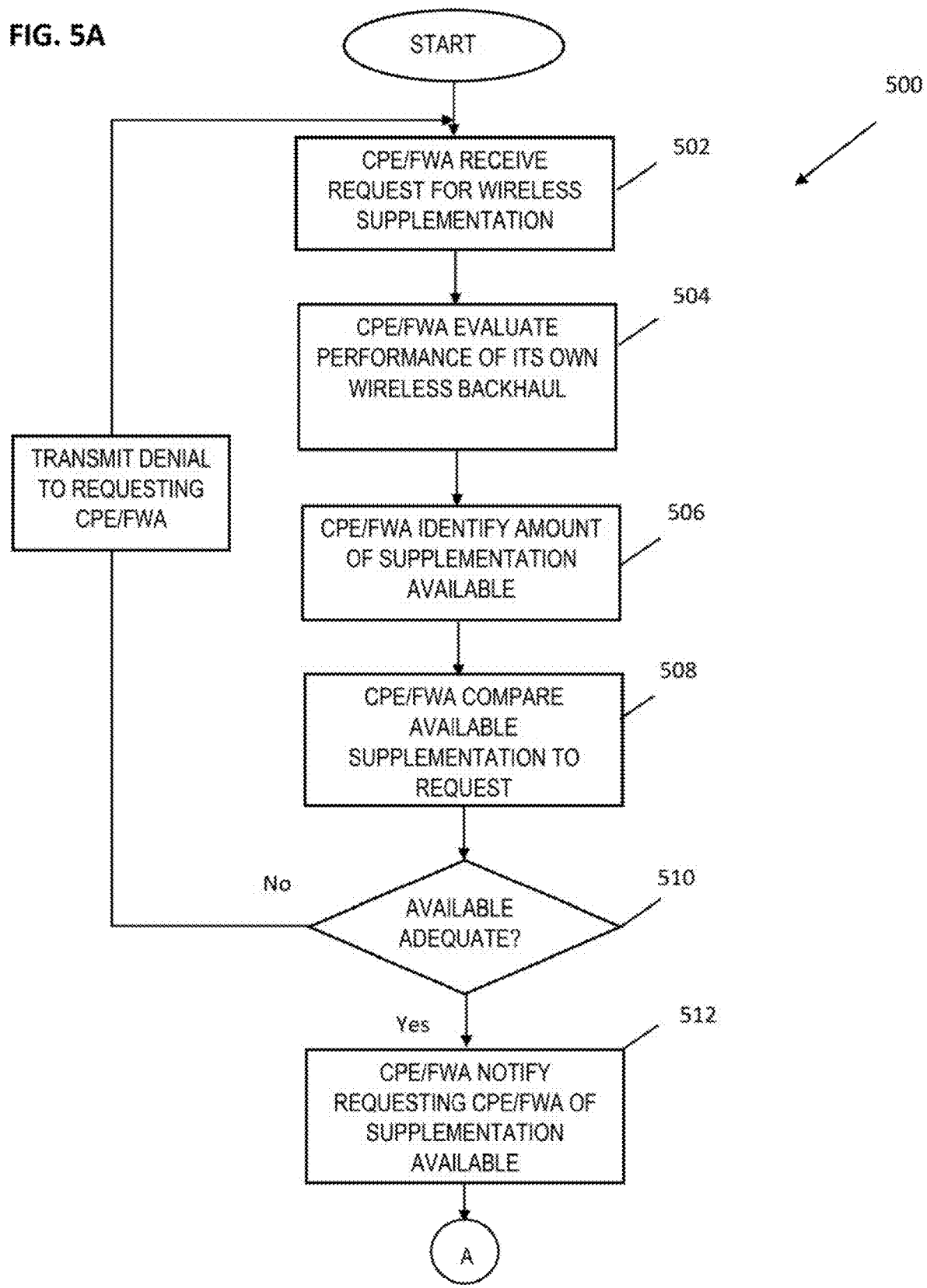
FIGS. 5A-5B are a logical flow diagram illustrating one embodiment of a generalized method of operating a CPE/FWA (e.g., High-TP or High-Throughput CPE/FWA) to provide "relay" supplementation to one or more other CPE/FWA, according to the present disclosure.
Figure 5B:
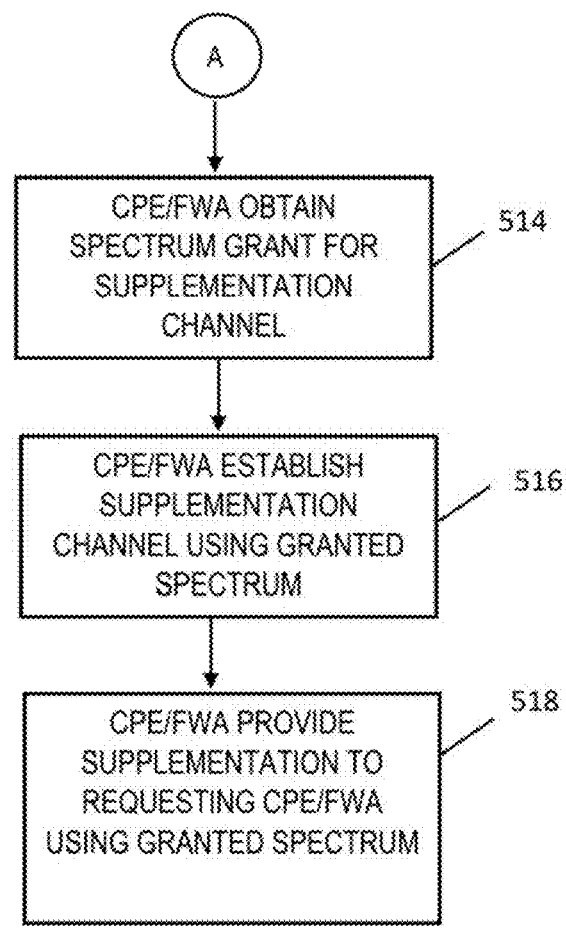

Various methods and embodiments thereof for enhancing throughput and coverage area utilizing relaying or supplementation via quasi-licensed (e.g., CBRS GAA or PAL) spectrum according to the present disclosure are now described with respect to FIGS. 4-5B.

FIG. 4 shows one exemplary embodiment of the method used by a CPE/FWA in obtaining supplementation of data bandwidth for itself, according to the present disclosure. As shown, the method 400 includes first monitoring performance using the performance monitoring process (e.g., iPerf 317) operative to execute on the CPE/FWA 303c (step 402).

Next, per step 404, the CPE/FWA detects inadequate performance of its backhaul (e.g., connection to its serving xNB 301a). For instance, as described above, the measured or actual data rate over a prescribed period of time (e.g., averaged over n minutes) for UL and/or DL is assessed, and compared to the relevant SLA(s). When the prescribed criterion is not met, the method proceeds to step 406, where the CPE/FWA (or a proxy therefore, such as the ProSe server described subsequently herein) identifies one or more other candidate (e.g., geographically local) CPE/FWA which can putatively supplement the bandwidth of the deficient CPE/FWA 303c (step 406).

At step 408, the CPE/FWA 303c transmits directly (or via proxy process) a communication to the identified one or more CPE/FWA 303a, 303b requesting supplementation. As described elsewhere herein, in one approach, a D2D communication channel is established between the various requesting/responding CPE/FWAs so as to facilitate establishment of the ultimate D2D "relay" channel (e.g., a channel via the primary air interfaces of the device using CBRS SAS-allocated bandwidth).

At step 410, after the requests have been received and spectrum is granted, the serving or high-TP CPE/FWA being supplementation of the requesting CPE/FWA 303c, and per step 412, the performance is again monitored by the recipient (served) CPE/FWA to assure that the necessary SLA goals or criterion are met.

Referring now to FIGS. 4A-4B, one implementation of the generalized methodology 400 of FIG. 4 is shown and described, in the exemplary context of a CBRS-based system with SAS, CBSD/xNBs and 4G/5G xNB, and in-coverage and out-of-coverage CPE/FWA devices as previously described.

Per step 421 of the method 420, each CPE/FWA utilizes its indigenous iPerf agent to measure KPIs (key performance indicators) such as TP, latency, and jitter.

Next, per step 423, the CPE/FWA each compares their measured data from step 421 with their respective SLAs, and if their data rates are higher than the SLA (or other relative criterion as discussed elsewhere herein), can act as relays or supplementation devices for other CPE.

Next per step 425, any low-TP CPE/FWAs with data rate lower than their specified SLA are identified. For instance, in one approach, each CPE/FWA can monitor itself and when a given CPE/FWA falls below SLA or other criteria, it can either advertise itself to the "network" as being such, or directly contact other CPE/FWA within the network, via D2D side channel or other mechanism.

Next, per step 427, the low-TP CPE 303c (or their proxy process) identify one or more high-TP CPE, and establish a D2D connection to the high-TP CPEs at step 429 so as to support negotiation for authentication, supplementation requests, determination of supplementation capability of the serving CPE/FWA 303a, 303b, spectrum grant communication, etc.).

Next per step 431, the iPerf agents on the low-TP CPE/FWA device(s) determine how much resource are needed from the supplementing high-TP CPE. As a brief aside, the exemplary iPerf client used in the various embodiments described herein is a tool for network performance measurement and tuning that can produce standardized performance measurements. iPerf can be configured with client and server functionality, and can create its own data streams to measure the throughput between the two "ends" of the connection in one or both directions. The data streams can be for example Transmission Control Protocol (TCP) or User Datagram Protocol (UDP), and various parameters are user configurable (in the present context, by MSO design or testing personnel, or even dynamically via remote control from a network process). IPerf is typically embodied as open-source software written in C, and runs on various platforms including Linux and Windows. Notwithstanding, the present disclosure contemplates use of other performance monitoring techniques (whether implemented by the DUT such as the CPE/FWA "self-assessing" itself, or from the other end of the connection, such as by a serving BS 301).

At step 433, the high-TP CPE 303a, 303b calculate the amount of resources that can be allocate to the low-TP CPE (e.g., using their own iPerf client processes and respective SLAs). Note that in one embodiment, to avoid repeated request/grant/withdrawal cycles between two CPE/FWAs (i.e., supplementation "dither"), the iPerfs and monitoring algorithms can be configured to smooth (e.g., average) out the various parameters over time, and also anticipate changes in operating conditions or demand which may occur for the serving (or served) CPE/FWA. For instance, if a given serving CPE/FWA 303a, 303b historically is largely inactive between 2:00 AM and 5:00 AM local time, it can be safely presumed in most cases that any excess capacity over and above SLA will be stable and not subject to sudden retraction or withdrawal by the serving CPE/FWA, such as might be caused by a user streaming multiple videos as might occur during normal (waking) hours. Similarly, if a requesting CPE only transiently falls below one or more of its SLA criteria, the algorithms may be configured to ignore such transients, and only allow for supplementation requests that are more pervasive and continuous in nature. Likewise, if the requesting CPE/FWA 303c is configured to anticipate that, even though performance is deficient or below requisite levels, that no salient demand will be forthcoming for say several hours (e.g., during the same late-night window as referenced above), it may selectively forestall issuing requests or advertisements for supplementation, since the lack of performance is a logical "don't care" state, and the supplementation would not be used anyway even if provided.

Next per step 435, the high-TP CPEs register to the SAS as CBSDs and request spectrum grants. Per step 437, the high-TP CPE receives the grant from the SAS, and per step 439 a data session between the requesting (served) CPE/FWA and the serving CPE/FWA is established using the granted spectrum. In one embodiment, normal 3GPP channel discovery and establishment procedures (including RACH, establishment of RRC Connected State, etc.) are performed as if between the CPE/FWA and a base station.

Next per step 441, the low-TP CPE requests data service from the high-TP CPE(s) via normal 3GPP signaling, and data exchange between the various CPE/FWAs (served and serving) occurs to support service flows for the requesting CPE/FWA 303c per step 443.

Per step 445, the data service support starts between the CPE to provide the requested supplementation. The data exchange process between the serving and served CPE is dynamic, and if the resources are not needed anymore, the SAS grant is relinquished by the serving CPE/FWA (e.g., via communication to the SAS) per step 447, and D2D connection is terminated.

FIGS. 5A-5B illustrate an embodiment of a generalized method of operation used by a serving CPE/FWA in providing data rate supplementation according to the present disclosure.

As shown, the method 500 includes the serving CPE/FWA receiving a request for data rate supplementation from a requesting or served CPE/FWA as described elsewhere herein (whether via polling/pull, active request "push" by the served CPE/FWA, via a proxy process, or other) per step 502.

Per step 504, the receiving CPE/FWA evaluates its own backhaul performance relative to its SLA.

Per step 506, based on the evaluation of step 504, the CPE/FWA identifies an amount of supplementation which it can provide, and compares this amount to the requested or requisite amount associated with the supplementation request (step 508). If the available capacity is adequate to support the request (step 510), then the serving CPE/FWA 303a, 303b notifies the requesting CPE/FWA 303c of the available supplementation (e.g., via D2D "side channel" messaging) per step 512. At step 514, the serving CPE/FWA obtains a spectrum grant via registration with the SAS, and establishes the supplementation channel with the served CPE/FWA 303c as previously described (step 516). The serving CPE then provides the supplementation of data services to the requesting CPE using the granted spectrum per step 518.

It will also be appreciated that while a single served CPE/FWA 303c is described in the context of the foregoing discussion, a given serving or supplementing CPE/FWA 303a, 303b may in fact service multiple requesting CPE/FWA simultaneously. For example, a given CPE/FWA may receive a request for supplementation from a first CPE/FWA, and provide service to that device, and then subsequently receive a request from another "deficient" CPE/FWA, and assuming that its performance/capability are adequate, supplement that device as well. In one such approach, the two requesting CPE are served via two different spectrum grants (i.e., using two different carriers or bands), and one or more allocated direction antenna elements and corresponding formed beams (the two requesting CPE presumed to be disparate enough in azimuth or elevation such that simultaneous supplementation is possible without unacceptable levels of interference). In another approach, a time-share or TDM based scheme is used on the same carrier or set of sub-bands. Using OFDM-based 3GPP mechanisms, different time/frequency resource blocks can be allocated to each served CPE/FWA as well. Each CPE may also be fitted with two or more separate transceiver chains (front ends) and associated baseband processing such that each served CPE may have its own dedicated air interface with a serving CPE/FWA if desired. Numerous other approaches to simultaneous provision of service to two or more requesting CPE will be recognized by those of ordinary skill when given the present disclosure.

Device to Device (D2D) Communication Mechanisms—

In one exemplary embodiment of the disclosure, communication between the various CPE/FWA devices 303 within a given network area is provided using 3GPP-based Proximity Services (ProSe). This capability allows for, inter alia, the provision of the following parameters to the CPEs to enable relay/supplementation connectivity among themselves, and assignment of unique IDs to each of the CPE: (i) security parameters; (ii) group membership data and unicast/multicast addresses; (iii) radio resource parameters; and (iv) service request/response messaging.

As a brief aside, 3GPP TS 32.277 V14.0.0 (2016 September), "Technical Specification—3rd Generation Partnership Project; Technical Specification Group Services and System Aspects; Telecommunication management; Charging management; Proximity-based Services (ProSe) charging (Release 14)," which is incorporated herein by reference, describes the exemplary ProSe functionality utilized in some embodiments of the present disclosure. First introduced in Release 12 of the 3GPP specifications, ProSe (Proximity Services) is a D2D (Device-to-Device) technology that allows 3GPP-compliant devices to detect on other, and to communicate directly as opposed to via the core functions. It uses new functional elements including a "sidelink" air interface for direct connectivity between devices. In comparison to existing D2D and proximity networking technologies, ProSe offers some benefits such as enhanced scalability and management, privacy, security and mobile device battery-efficiency.

Figure 6A:
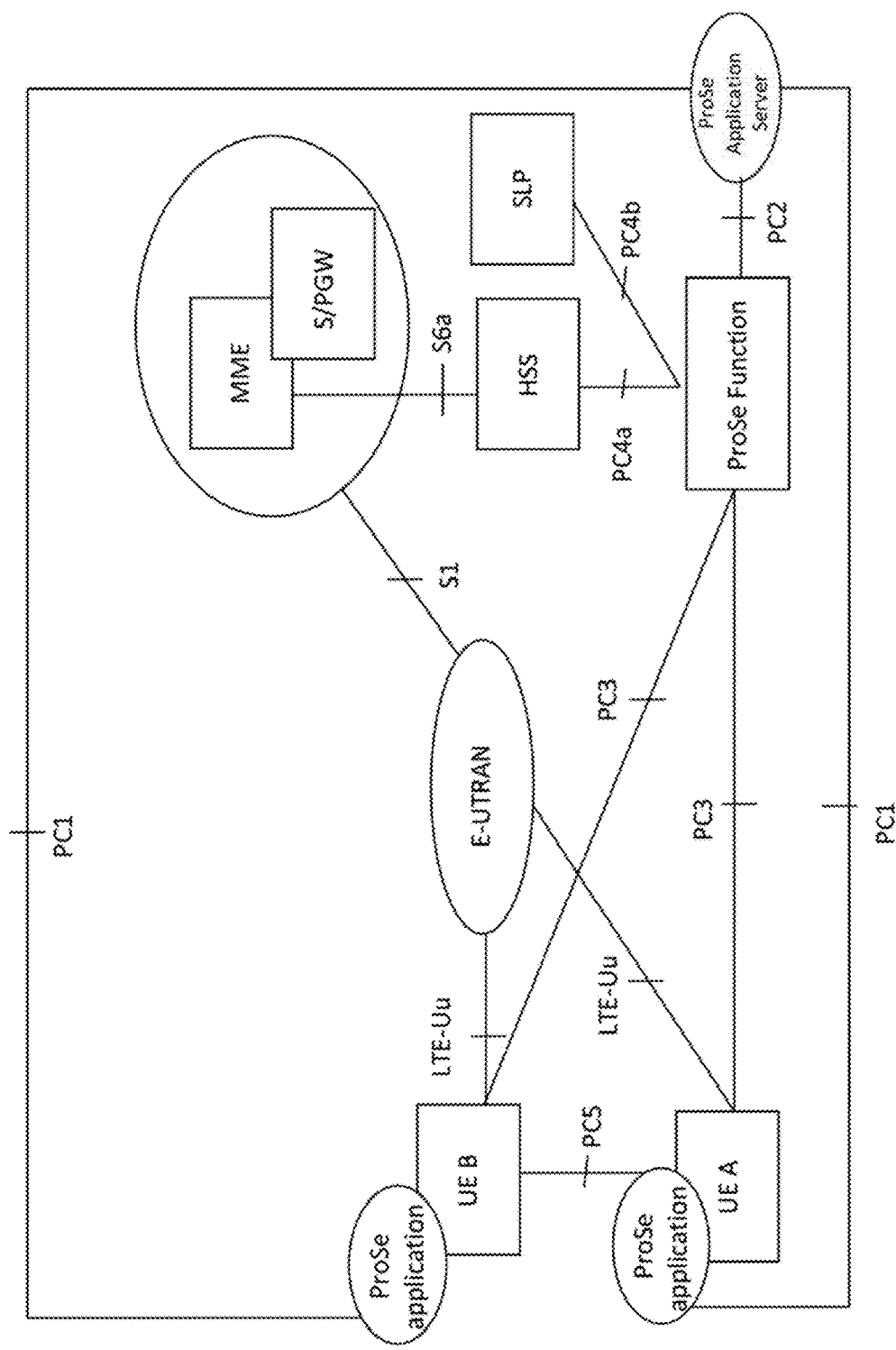
FIG. 6A is a block diagram of a prior art non-roaming reference architecture for proximity services (ProSe) according to 3GPP Release 14.

FIG. 6A is a block diagram of a prior art non-roaming reference architecture for proximity services (ProSe) according to 3GPP Release 14.

Figure 6B:
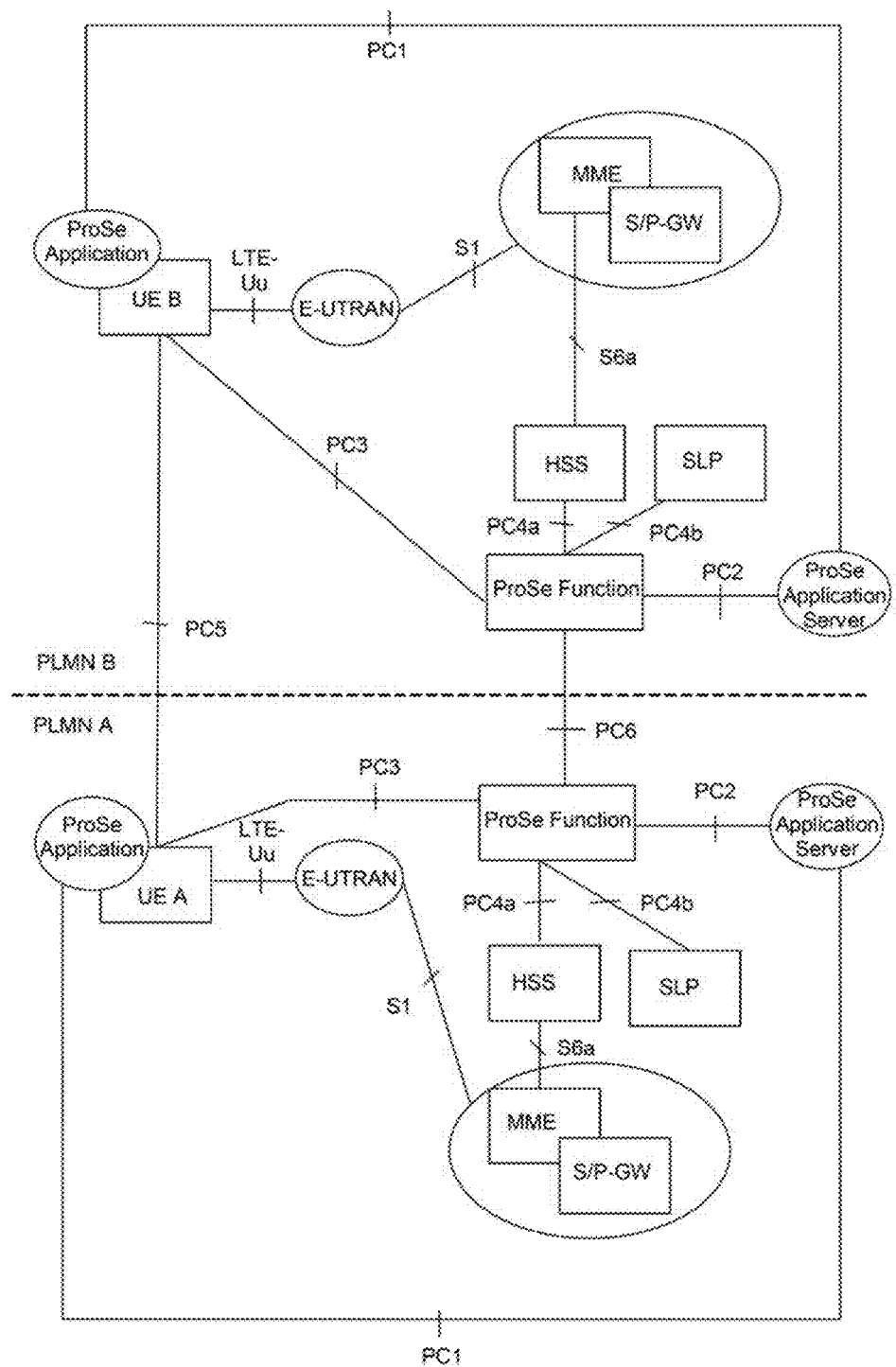
FIG. 6B is a block diagram of a prior art inter-PLMN reference architecture for proximity services (ProSe) according to 3GPP Release 14.

FIG. 6B is a block diagram of a prior art inter-PLMN reference architecture for proximity services (ProSe) according to 3GPP Release 14.

Figure 6C:
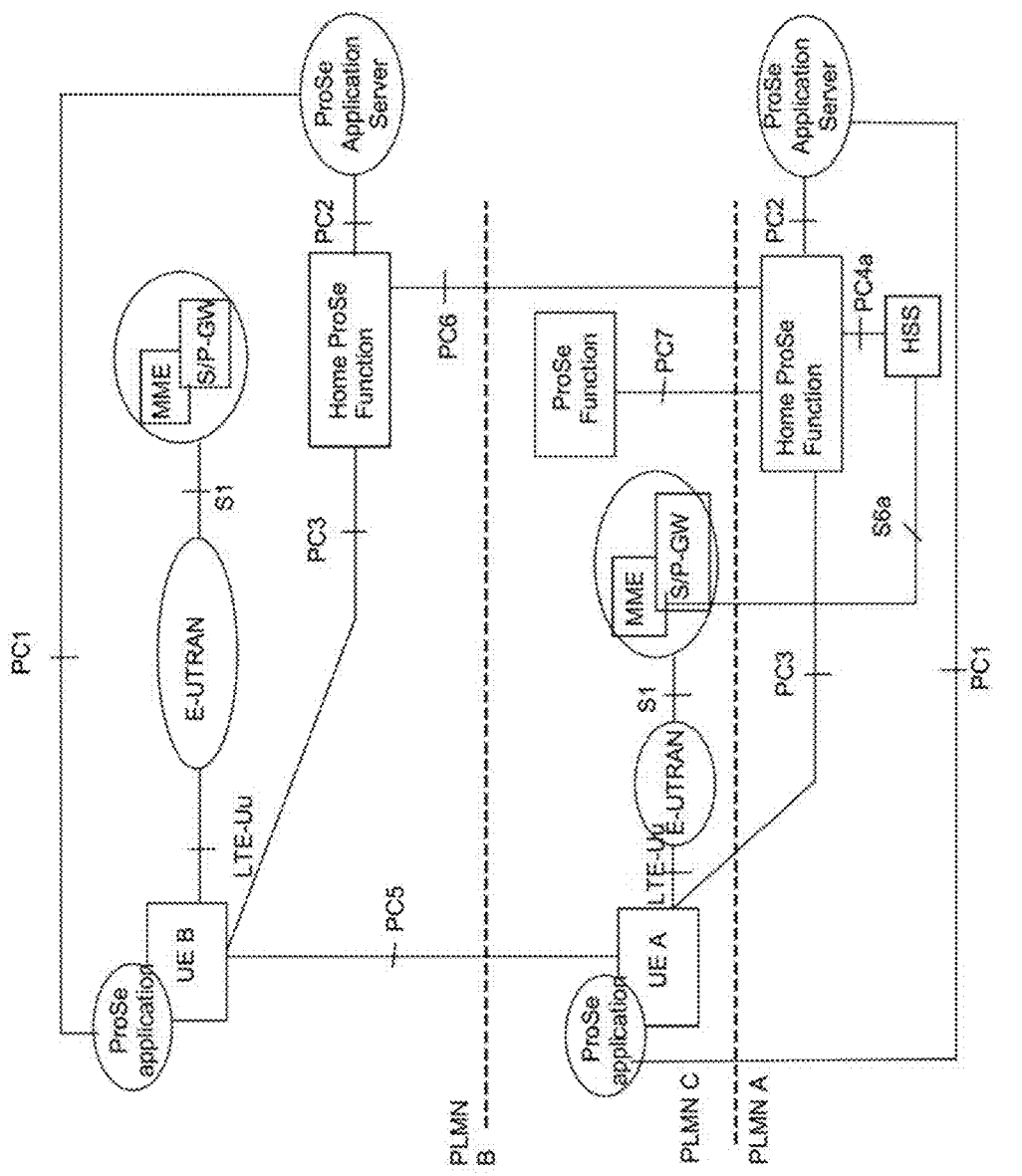
FIG. 6C is a block diagram of a prior art roaming reference architecture for proximity services (ProSe) according to 3GPP Release 14.

FIG. 6C is a block diagram of a prior art roaming reference architecture for proximity services (ProSe) according to 3GPP Release 14.

As can be seen in each of the above Release 14 architectures, a client-server model is used wherein a ProSe application on a UE communicates logically with a ProSe application server via e.g., a ProSe network function within the PLMN (public land mobile network) associated with the UE. A PC5 inter-UE communication interface is utilized for D2D communication (i.e., UE to UE) as shown, and Uu interfaces are used from the UEs back to the E-UTRAN.

Figure 7:
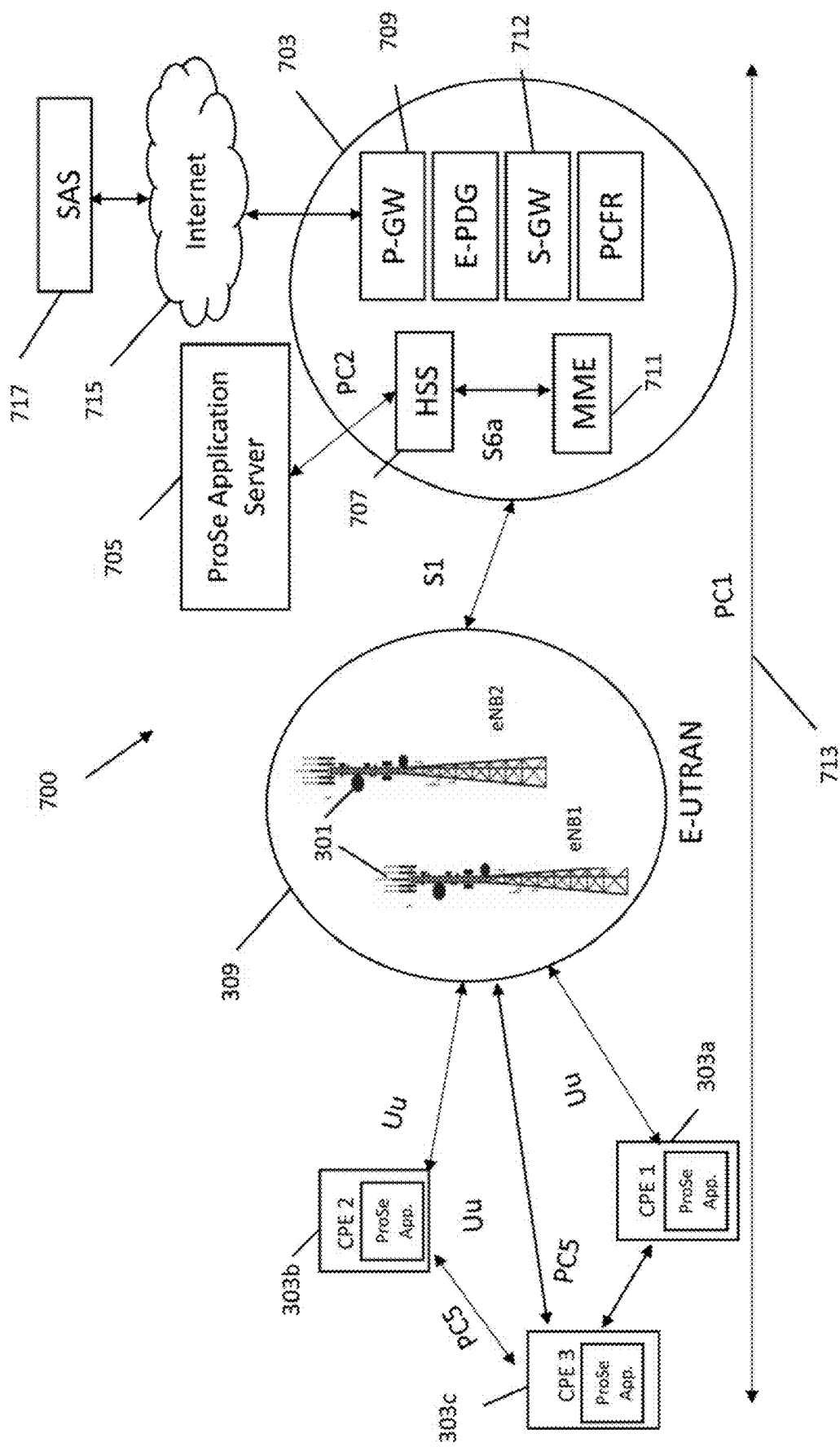
FIG. 7 is a block diagram of illustrating one embodiment of a quasi-licensed wireless network architecture, including ProSe (proximity services) capability, according to the present disclosure, wherein a 3GPP E-UTRAN-based configuration is used.

As shown in FIG. 7, embodiments of the present disclosure leverage the foregoing ProSe architecture to enable, among other things, CPE/FWA to CPE/FWA communication in support of the relay and supplementation functions. In the architecture 700 of FIG. 7, the low-TP CPE 303c receive/transmit from/to the E-UTRAN (including eNBs 301) over the Uu interface. Also, the serving or high-TP CPEs 303a, 303b receive/transmit data from/to the low-TP CPE 303c over the PC5 interface. This data is aggregated at transport layer as subsequently described herein with respect to FIGS. 8 and 8A.

The Evolved Packet Core (EPC) 703 transfers the aggregated data packet from eNBs to e.g., the Internet 715 and then to the SAS 717 (via a DP, not shown). The EPC unit consists of Mobility Management Entity (MMS) 711, Packet Data Gateway (P-GW) 70, Evolved Packet Data Gateway (E-PDG), Serving Gateway (S-GW) 712, Policy and Charging Rules Function (PCFR), and Home Subscriber Server (HSS) 707. The ProSe application server 705 communicates directly with the EPC core 703 via the PC2 interface (or alternatively may be communicative with the EPC via the Internet 715) to provide support of the ProSe "apps" operative on each CPE/FWA within the architecture, including via the illustrated PC1 interface 713.

Figure 7A:
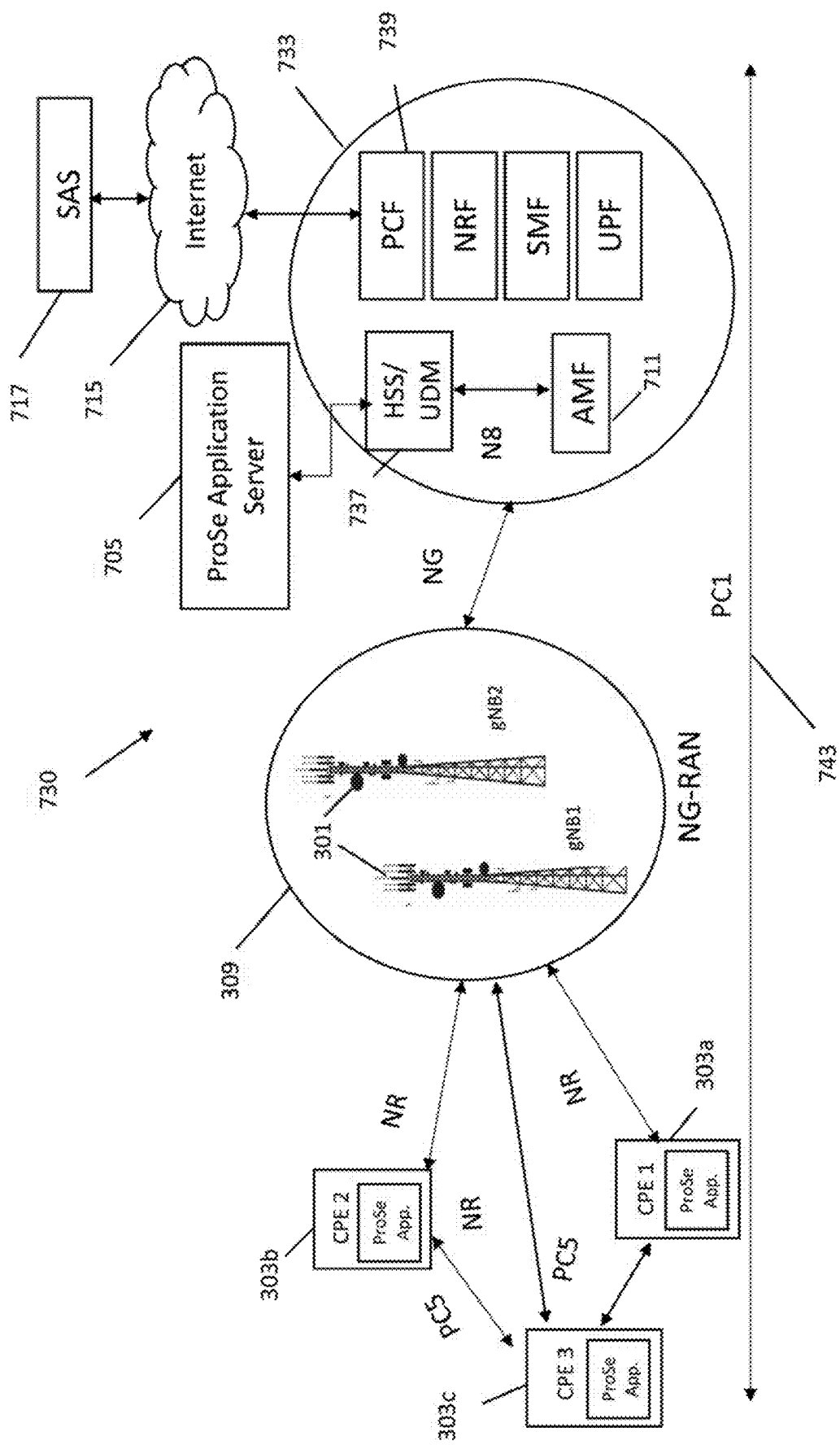
FIG. 7A is a block diagram of illustrating one embodiment of a quasi-licensed wireless network architecture, including ProSe (proximity services) capability, according to the present disclosure, wherein a 3GPP 5GC-based configuration is used.

FIG. 7A shows another embodiment of the ProSe architecture 730 of the present disclosure, wherein 5G NR network entities are utilized (including gNBs 301 and NG-RAN, 5GC 733, PCF 739, UDM/HSS 737, and AMF 711), as well as the ProSe app to Server interface 743.

As will be recognized, one major difference between the 5G Core (5GC) compared to the EPC is that 5GC's control plane (CP) functions interact in a Service-Based Architecture (SBA). The Network Repository Function (NRF) provides NF service registration and discovery, enabling NFs (network functions) to identify appropriate services within one another. These SBA principles apply to interfaces between CP functions within 5GC only, so interfaces towards the Radio Access Network (NG-RAN), CPE/FWA or user plane (UP) functions (N1, N2, N3, N4, N6 and N9) are excluded. 5GC also has functional separation of the Access and Mobility Functions (AMF) and Session Management Functions (SMF), and also includes the separation of UP (user plane) and CP (control plane) functions of the gateway, which is an evolution of the gateway CP/UP separation (CUPS) introduced in 3GPP Release 14 for the EPC. Other differences include a separate Authentication Server (AUSF), and several new functions, such as the Network Slice Selection Function (NSSF) and the Network Exposure Function (NEF), each of which can be leveraged by e.g., a network operator such as an MSO/MNO when provisioning services to the various CPE/FWA, including in support of ProSe functions.

It will be appreciated that while the various embodiments of the present disclosure are described in the context of D2D communication provided via the 3GPP ProSe standards and framework, the present disclosure is in no way so limited, and in fact other D2D or "pseudo-D2D" communication modalities (including those which must pass through at least a portion of the MSO/MNO infrastructure supporting the CPE/FWAs) may be used consistent with the disclosure to provide the necessary cross-CPE/FWA identification and communication functionality.

Packet Management—

In that packet streams for a given recipient (e.g., served low-TP) CPE/FWA 303c must at some level be split and carried across each of the serving bearers (other CPE/FWA 303a, 303b, and the base station 301), some mechanism is needed to manage such packet stream splitting and recombination. In one exemplary approach, a transport layer function is used to manage packet allocations across the different bearers. This approach advantageously obviates any PHY or link-layer modifications, and also supports high-throughput so as to maintain QoS and SLA requirements for the target (served) CPE/FWA 303c.

Figure 8:
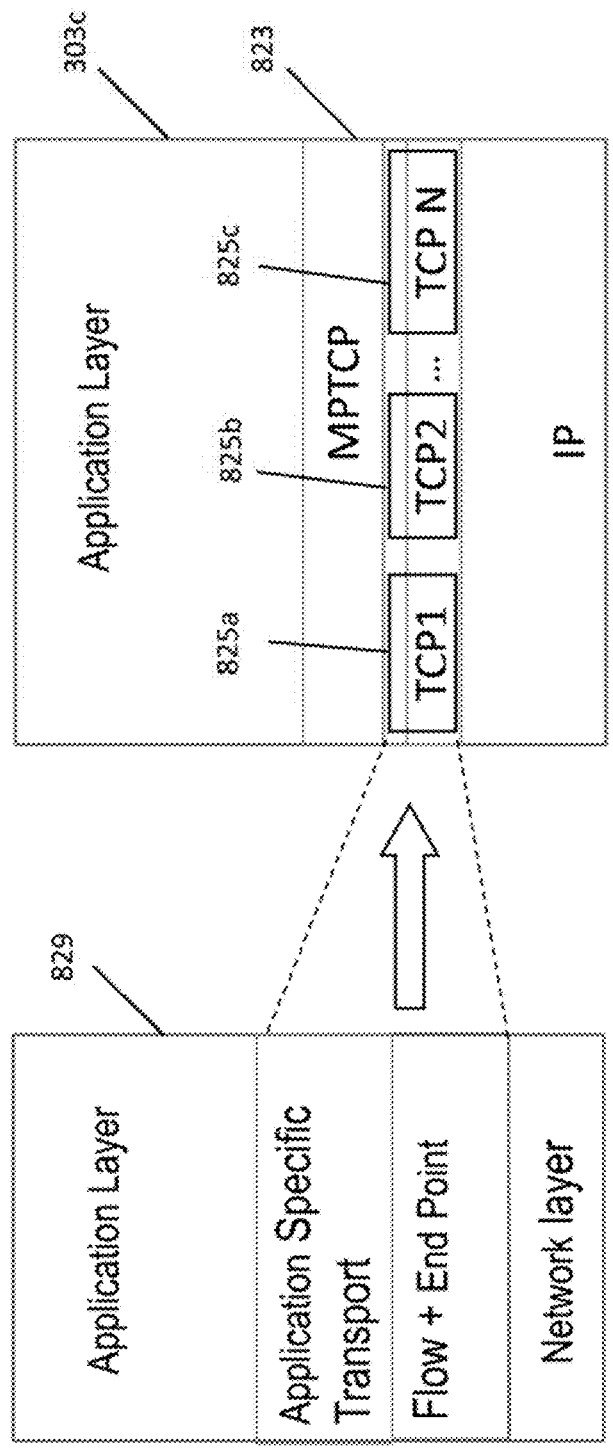
FIG. 8 is a graphical representation of aggregation of multiple TCP links within a protocol stack of a supplemented CPE/FWA, according to one embodiment of the present disclosure.

FIG. 8 shows an example of aggregation of multiple links at the application layer of the low-TP CPE/FWA 303c. As shown, the Transmission Control Protocol (TCP) packets 825a-c from the respective high TP-CPEs 303a, 303b and the serving base station (eNB or gNB) 301 are aggregated in the application layer of the recipient low TP-CPE 303c based on use of an exemplary multiple path "transport layer" protocol such as Multi-path Transmission Control Protocol (MPTCP) 823.

As a brief aside, MPTCP allows a Transmission Control Protocol (TCP) connection to use multiple paths to, inter alia, maximize resource usage and increase redundancy. These features enable inverse multiplexing of resources, and hence in theory increases TCP throughput to the aggregate of all available link-level channels (as opposed to a single one as required by non-MPTCP implementations based on standard TCP). Additionally, link-level channels may be added or dropped, such as where a given CPE/FWA begins or ceases supplementation of a served CPE/FWA in the present context, without disrupting the end-to-end TCP connection between e.g., the served CPE/FWA and a remote network server such as a content or web server. Link handover is handled by abstraction in the transport layer, without change to the network or link layers. Accordingly, link handover and instantiation/teardown can be implemented at the endpoints of the TCP session (e.g., the CPE/FWA) without requiring special functionality in the supporting sub-network infrastructure. Multipath TCP can balance a single TCP connection across multiple interfaces to achieve a desired throughput.

Hence, in the illustrated embodiment of FIG. 8, the application layer process 829 can utilize application-specific transports and endpoints and via MPTCP (including e.g., each of the data connections between the served CPE/FWA and the base station 301, as well as the other serving CPE/FWA), support each of these via common transport layer functionality. Aggregation of these multiple links is applied using MPTCP at the backhaul (baseband) of the low-TP or served CPE/FWA 303c, in effect allowing the served CPE/FWA to act as a transport layer aggregator of (and congestion control process for) multiple packet streams 825, including those intended for the served CPE yet received via the different air interface channels.

Figure 8A:
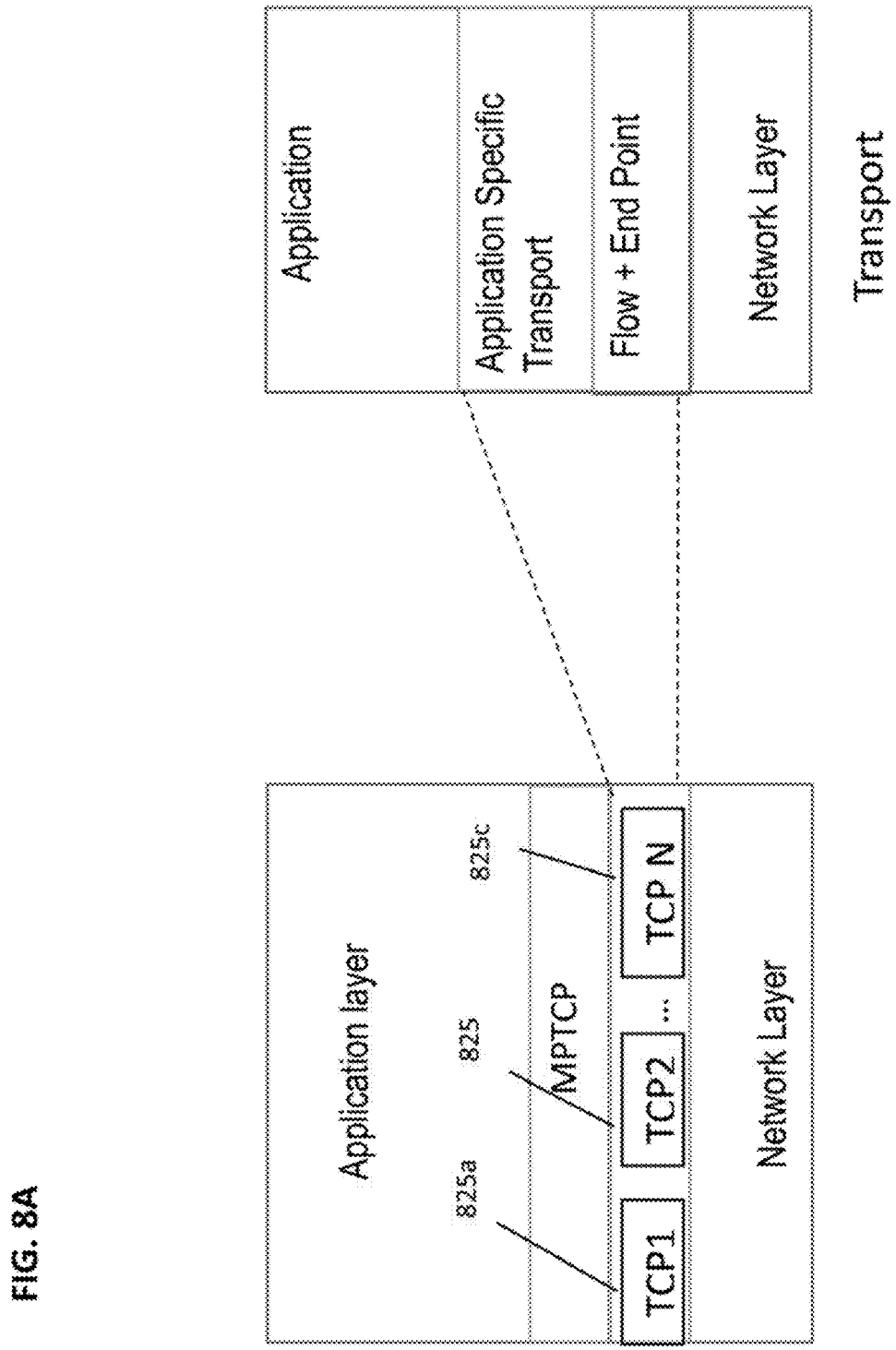
FIG. 8A is a graphical representation of splitting an aggregated multiple TCP links to the individual TCP packet within a protocol stack of a supplemented CPE/FWA, according to one embodiment of the present disclosure.

FIG. 8A shows an example of splitting the aggregated packets to individual packet streams at the transport layer of the low-TP CPE. For example, in one embodiment, the streams from various CPE/FWA and network base-stations (s) are combined using MPTCP at the low-TP CPE. The reverse is carried out from the CPE towards other CPE/FWA and the serving base-station(s). Any duplication of packets is taken care of by the underlying PDCP (packet data convergence protocol) of LTE (i.e., TS 25.323 and related).

FIG. 8B illustrates one exemplary generalized method 850 of packet management over multiple bearers according to the present disclosure. As shown, in step 852, the low-TP CPE/FWA 303c receives packets associated with one of its streams or flows (e.g., an application layer process 829) from its serving base station (xNB). Per step 854, it also receives packets from one or more serving or supplementing CPE/FWA 303a, 303b, via the air interface channels established with those devices.

At step 856, the recipient low-TP CPE/FWA aggregates the packets from all sources at its backhaul transport layer (e.g., using the MPTCP protocol), and applies congestion and flow control per step 858 so as to optimize the backhaul as a "virtual unified" transport (e.g., via balancing of the individual link-layer constituents associated with the respective bearers).

Inter-Process Protocol—

Figure 9:
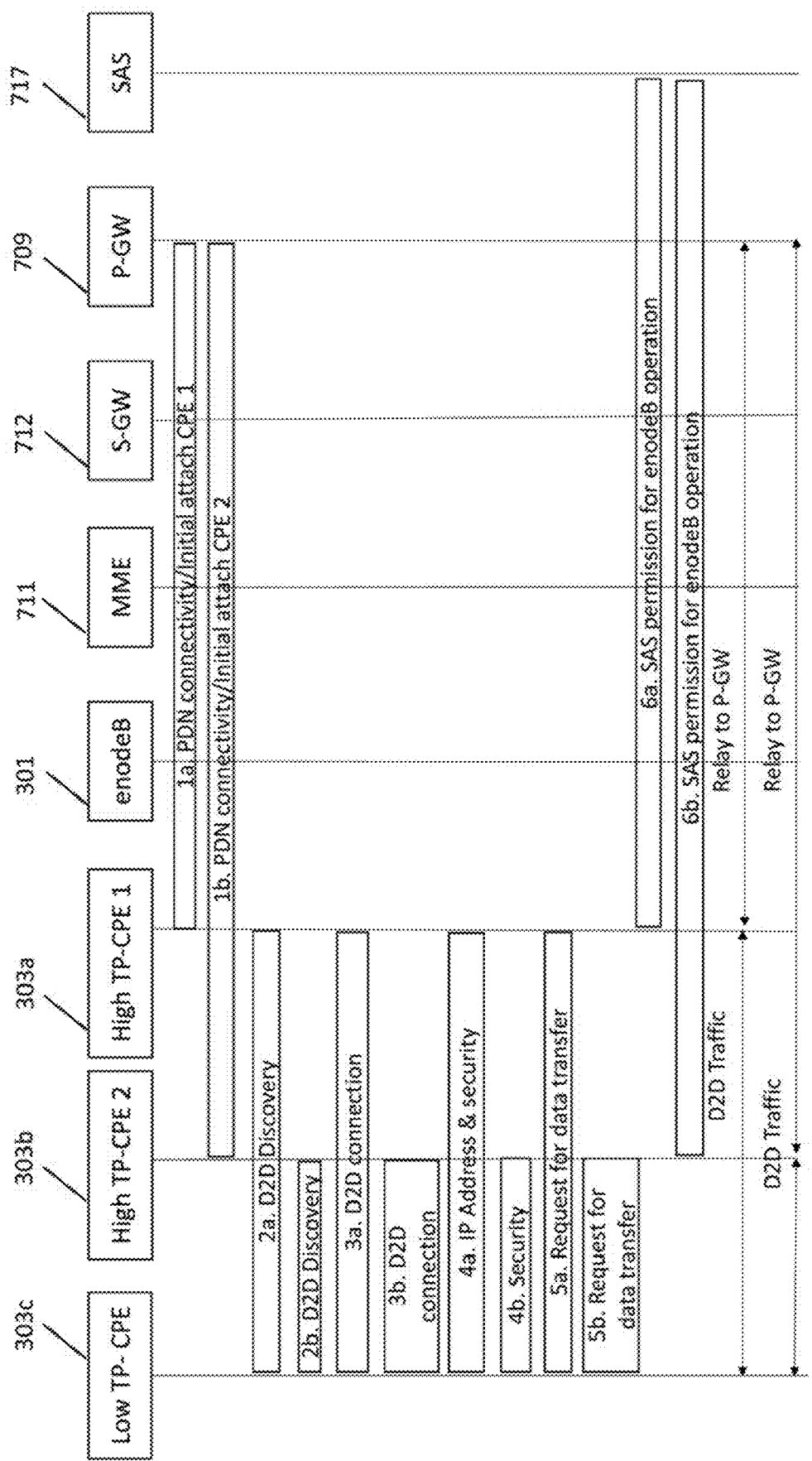
FIG. 9 is a ladder diagram illustrating the communication flow for enhancing coverage area and throughput of a quasi-licensed band wireless system in accordance with the methods of FIGS. 4-5B.

FIG. 9 is a ladder diagram illustrating the communication flow for enhancing coverage area and throughput of quasi-licensed wireless service in accordance with the exemplary methods of FIGS. 4-5B.

In the embodiment illustrated in FIG. 9, the communication protocol 900 includes the "in coverage" or serving (high-TP) CPE/FWAs 303a, 303b (see FIG. 3A) first performing initial attach procedures with the relevant E-UTRAN/EPC entities (including the P-GW packet gateway 709) via their respective serving eNBs 301 (steps 1a and 1b).

Next, D2D discovery between the low-TP CPE/FWA 303c and the CPE/FWA of the other houses 303a, 303b is performed, and supporting functions such as IP address discovery and device authentication/negotiation are performed, as shown in FIG. 9 (steps 2a-5b). It will be appreciated that this D2D process may be "push" or "pull" from any node to any other, depending on how the protocol is configured (e.g., the low-TP CPE/FWA may periodically monitor itself and instigate the request for supplementation as in FIG. 4 previously described, or alternatively one of the high-TP CPE/FWA devices may periodically poll other CPE/FWA (including the low-TP CPE/FWA) to cause the latter to evaluate their TP (e.g., versus their relevant SLA) and report back to the polling device.

It will be appreciated that the D2D discovery and connection process of steps 2a-5b may also take several different forms, depending on the particular functionality desired. For instance, in one approach, discovery and connection with all available prospectively supplementing CPE/FWA is established irrespective of whether the low-TP CPE/FWA 303c will utilize them; the various connected CPE/FWA will evaluate their own ability to supplement (as previously described with respect to e.g., FIGS. 4A-5B), and either the requesting CPE/FWA 303c or the supplementing CPE/FWA 303a, 303b will decide which of the connected population are ultimately utilized.

Alternatively, in another approach, more serialized logic is utilized, such as where the connection and evaluation of each prospective supplementing CPE/FWA is conducted before any further D2D connections to other CPE are established. For instance, if the first "connected" CPE/FWA is capable of providing complete supplementation to the low-T CPE/FWA (e.g., up to its SLA), then no further communication is required with other CPE/FWA. This approach has the advantage of lower processing overhead and simultaneous radiated interference from the participating CPE (e.g., as opposed to a "broadcast" or other such model), yet may also introduce additional latency in reaching full SLA supplementation for the low-TP CPE/FWA.

In yet another approach, the low-TP CPE/FWA 303c may access historical or even predictive/speculative data regarding one or more known CPE/FWA (e.g., captured via prior sessions between the devices, or via a download of such data from one or more of the MSO or MNO core entities), and use this data to make an "educated guess" as to which CPE/FWA is likely to be the optimal choice for supplementation (e.g., which CPE/FWA or grouping thereof has historically provided, or is projected to provide, complete supplementation with the minimum of overhead. For example, if one nearby CPE/FWA has historically always been able to provide complete SLA supplementation to the low-TP CPE/FWA 303c by itself, then this is an obvious first choice. As such, the present disclosure contemplates that each CPE/FWA may build its own (or be provided with) a hierarchy or "logic tree" to be applied to the D2D logic of steps 2a-5b in FIG. 9.

It will also be appreciated that the foregoing decisions/logic may be handed off to a network entity or process, such as logic within the P-GW 709, or even another MNO or MSO entity including e.g., the ProSe server when so equipped.

Per steps 6a-6b of FIG. 9, the participating (supplementing) CPE/FWA 303a, 303b then contact the cognizant spectrum allocation process (e.g., the SAS 717 for CBRS implementations), such as via an MSO-based or third-party domain proxy (DP)—not shown, to request a spectrum grant to enable bandwidth supplementation to the requesting low-TP CPE/FWA 303c. Per CBRS protocol, the SAS registers the devices and returns the respective grant(s) to each requester 303a, 303b, thereby enabling establishment of wireless connection (e.g., RRC Connected state) via the primary air interface of each CPE/FWA (i.e., within the 3.550-3.70 GHz band using 3GPP LTE or NR protocols).

It is noted that the D2D discovery and connection protocols of steps 2a-5b are in one embodiment conducted using a "sidelink" (e.g., as specified in Rel. 12/13), or another alternate channel which may be available for such purposes. In one embodiment, the system (granted) frequency utilized by the extant CPE/FWA (i.e., the high-TP CPE) is used for purposes of the D2D/sidelink communications, although it will be appreciated that other frequencies or bands may be used consistent with the present disclosure. The sidelink frequency can also be indicate in the grant. In one operational scenario, all of the participating CPE/FWA devices are already "in-network" and have established communication and SAS grants through the network, and hence at time of supplementation, a new grant is not needed for the initial "relay" or D2D communications. However, when the supplementing CPE/FWA(s) are required to transmit (akin to a base-station) to support the other (supplemented or low-TP) CPE/FWA, a new grant is requested from the SAS as shown on FIG. 9. In FIG. 9, the high-TP CPE/FWAs are requesting permission from the SAS for "xNB-like operation" to support the low-TP CPE.

Similarly, an "in-network" or established low-TP would not require a grant, as it already has a grant from the network prior to establishment of the D2D sidelinks with the other CPE/FWA(s).

CBRS FWA Apparatus—

Figure 10:
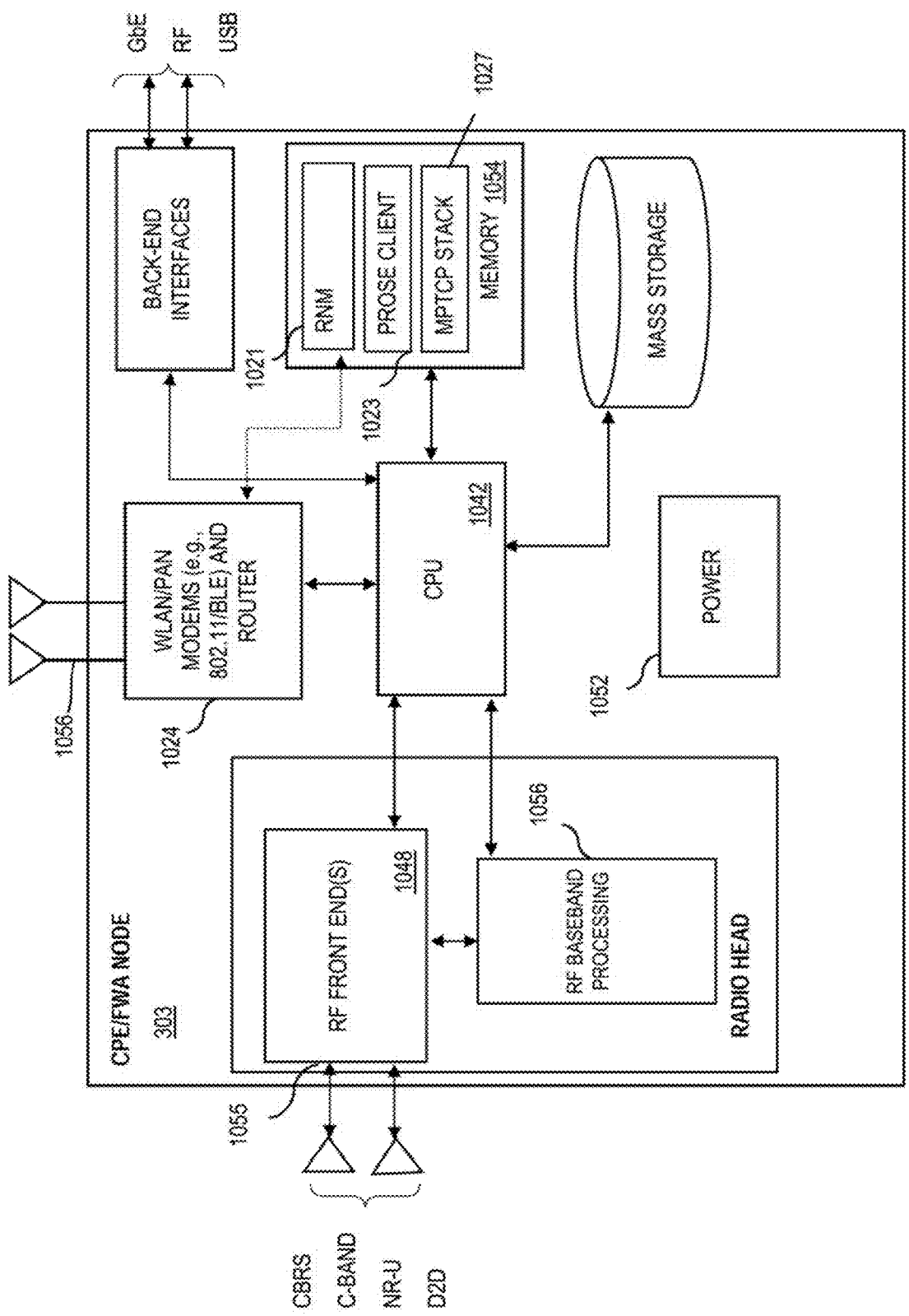
FIG. 10 is a functional block diagram illustrating one embodiment of an exemplary CPE/FWA apparatus according to the present disclosure.

FIG. 10 illustrates one exemplary embodiment of a CPE/FWA 303 (e.g., roof-mounted FWA with associated radio head and CPE electronics) configured according to the present disclosure. It will be appreciated that while described in the context of a CBRS-compliant FWA, the device of FIG. 10 may be readily adapted to other spectra and/or technologies such as e.g., Multefire, DSA, LSA, or TVWS.

As shown in FIG. 10, the CPE/FWA is a Relay Node Manager (RNM)- and ProSe-enabled device which includes, inter alia, a processor subsystem with CPU 1042, a memory module 1054, one or more radio frequency (RF) network interface front ends 1048 (e.g., adapted for operation in the 3.55-3.70 GHz band, C-Band, NR-U bands, etc.) and associated antenna elements 1055, one or more backend interfaces (e.g., USB, GbE, etc.), a WLAN/BLE module 1024 with integrated WLAN router and antennae 1056, power module 1052 (which may include the aforementioned PoE injector device), and an RF baseband processing module 1056.

In one exemplary embodiment, the processor subsystem 1042 may include one or more of a digital signal processor (DSP), microprocessor (e.g., RISC core(s) such as ARM core), field-programmable gate array, GPU, or plurality of processing components mounted on one or more substrates (e.g., printed circuit board). The processor subsystem/CPU 1042 may also comprise an internal cache memory (e.g., L1/L2/L3 cache). The processor subsystem is in communication with a memory subsystem 854, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 1042 is configured to execute at least one computer program stored in program memory 854 (e.g., a non-transitory computer readable storage medium). A plurality of computer programs/firmware are used and are configured to perform various functions such as communication with relevant functional modules within the CPE/FWA 303 such as the radio head and WLAN/BLE module 1024.

Various other functions useful for and typical in "radio head" electronics including baseband management (e.g., transmit and receive functions via the baseband processor 1056 and associated Tx and Rx chains of the RF front end 1048. For example, in one embodiment, the Tx and Rx chains are part of an RF front end used for OFDM-based RF communication with CBSD devices (e.g., xNB 301 operating as CBRS base stations deployed by the MSO or a third party, so as to provide backhaul).

In the exemplary embodiment, the memory subsystem 1054 includes a Relay Node Manager (RNM) process or logic module 1021 configured to process relaying functionality and protocols such as those described according to FIGS. 3A-5B. For instance, in one implementation, the RNM 1021 includes the necessary logic and functionality to (i) determine if the CPE/FWA TP is lower than a prescribed SLA; (ii) access data within e.g., memory 1054 or the mass storage device relating to known other CPE/FWA 303; (iii) if no other CPE/FWA are known a priori to the low-TP CPE/FWA, initiate a search for the same; (iv) Establish a D2D connections to one or more of the other CPE/FWA; (v) request data/bandwidth supplementation from the other device(s); and (vi) act as a supplementation CPE/FWA or relay if the indigenous TP is higher than SLA. Since the physical channel dynamics for a given CPE/FWA may change over time (whether increase or decrease) such as due to new xNB install or extant xNB removal, growth of trees, introduction of other interferers, etc. over time, each CPE/FWA 303 installed is in the exemplary embodiment configured to enable acting as either a supplemented device (i.e., low-TP device) or a supplementation provider (i.e., high-TP device) at any given time.

As shown, the CPE/FWA 303 also includes the previously described ProSe logic module 1023 for D2D communication support, as well as MPTCP stack logic 1027 to implement e.g., the packet management and related functions as described with respect to FIGS. 8A-8C.

Service Provider Network—

Figure 11:
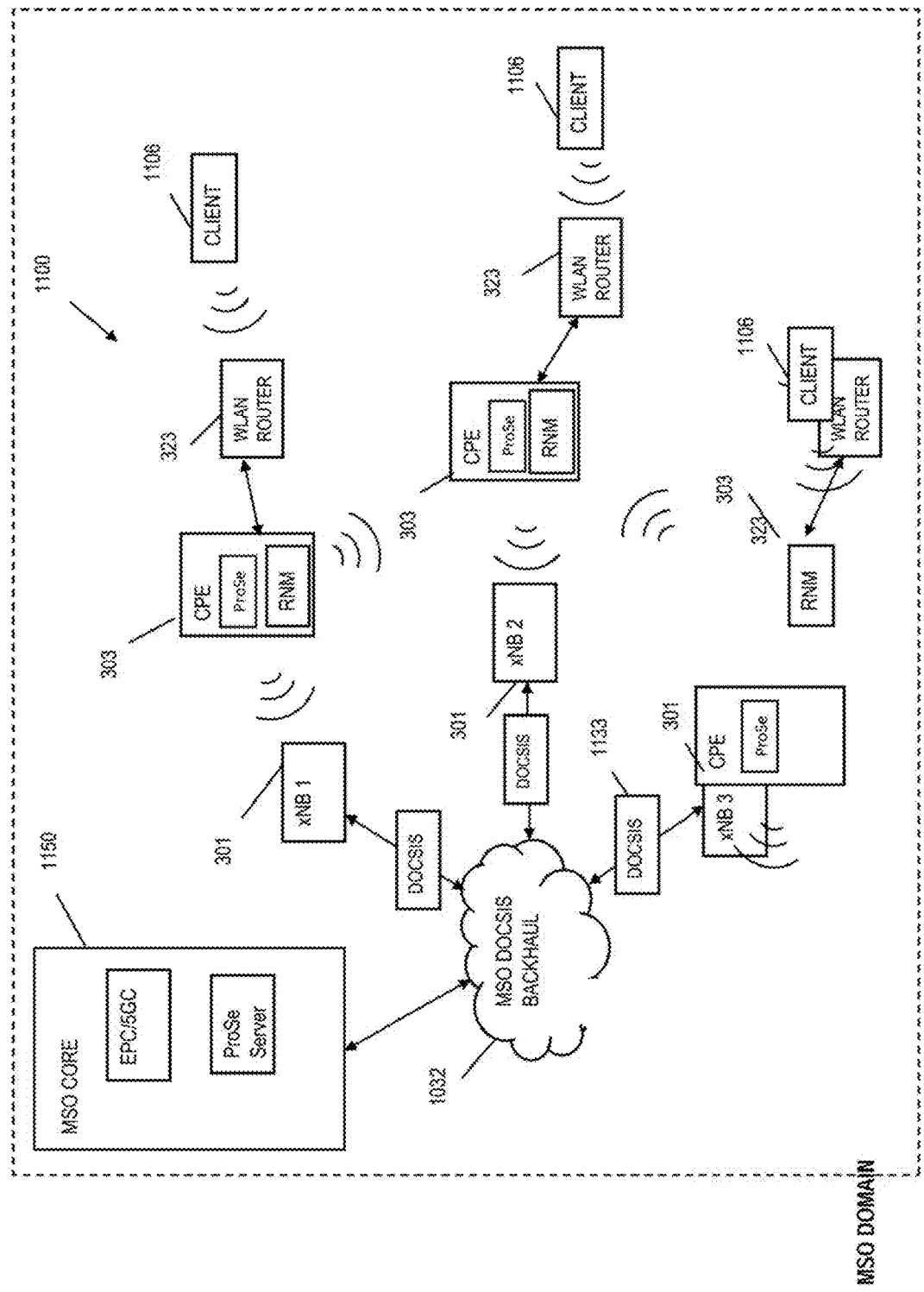
FIG. 11 is a functional block diagram of an exemplary network architecture useful in conjunction with various principles described herein, wherein the 3GPP core and ProSe functions are integrated within one service provider (e.g., MSO) network core.

FIG. 11 illustrates one embodiment of a service provider network configuration useful with the relaying functionality and supporting 3GPP/CBRS-based wireless network(s) described herein. It will be appreciated that while described with respect to such network configuration, the methods and apparatus described herein may readily be used with other network types and topologies, whether wired or wireless, managed or unmanaged.

The exemplary service provider network 1100 is used in the embodiment of FIG. 11 to provide backbone and Internet access from the service provider's wireless access nodes (e.g., CBSD/xNBs, Wi-Fi APs, FWA devices or base stations operated or maintained by the MSO), and one or more stand-alone or embedded cable modems (CMs) 1133 in data communication therewith.

The individual xNBs 301 are backhauled by the CMs 1133 to the MSO core via e.g., CMTS or CCAP MHAv2/RPD or other such architecture, and the MSO core 1150 includes at least some of the EPC/5GC core functions previously described, as well as the ProSe Application Server as shown. Each of the CPE/FWA 303 are communicative with their respective xNBs 301, as well as other CPE/FWA as needed to support the relay functions previously described. Client devices 1106 such as tablets, smartphones, SmartTVs, etc. at each premises are served by respective WLAN routers 323, the latter which are backhauled to the MSO core or backbone via their respective CPE/FWA.

Notably, in the embodiment of FIG. 11, all of the necessary components for support of the relay functionality are owned, maintained and/or operated by the common entity (e.g., cable MSO). The approach of FIG. 11 has the advantage of, inter alia, giving the MSO complete control over the entire service provider chain, including control over the xNBs so as to optimize service to its specific customers (versus the non-MSO customer-specific service provided by an MNO), and the ability to construct its architecture to optimize incipient 5G NR functions such as network slicing, gNB DU/CU Option "splits", etc.

Figure 12:
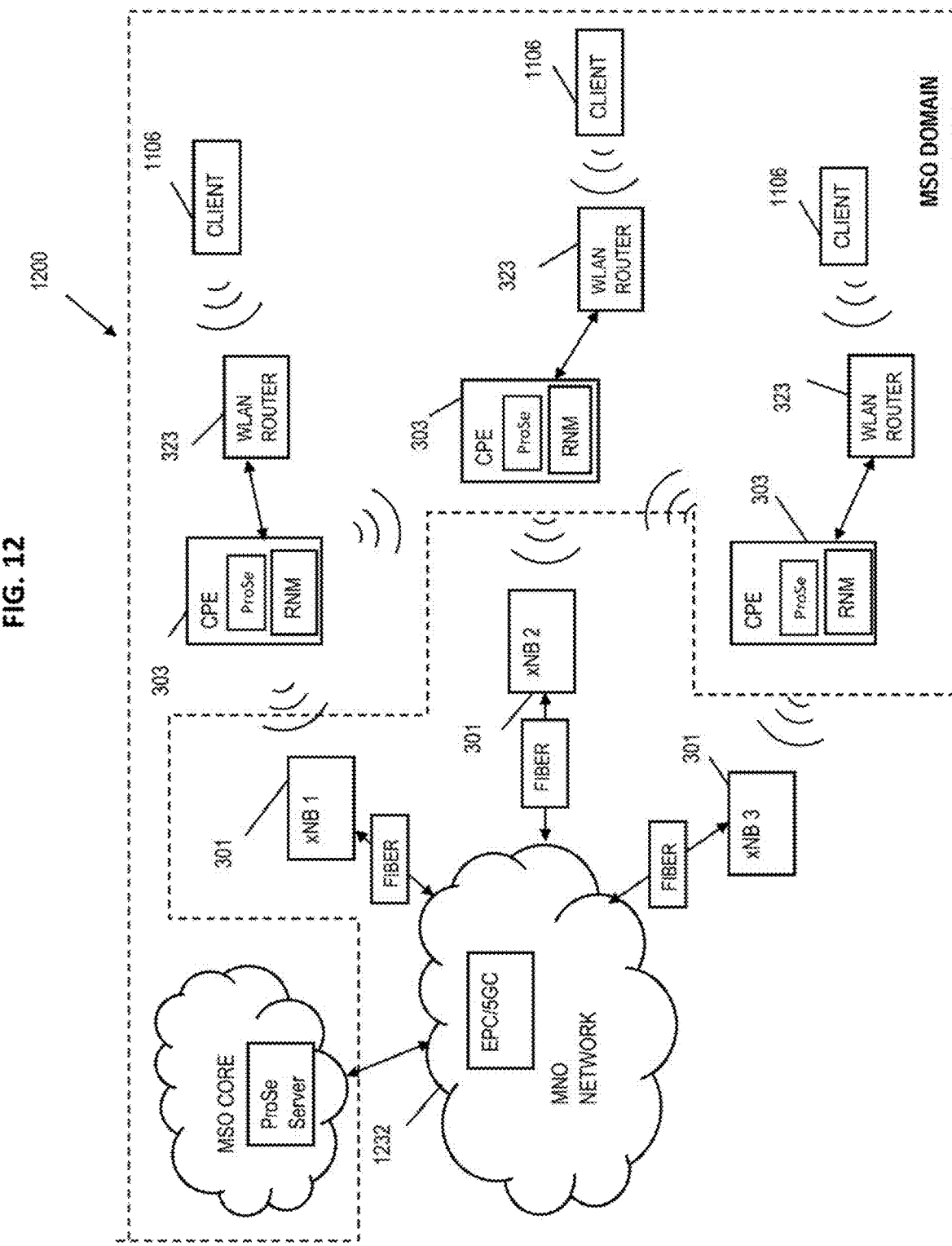
FIG. 12 is a functional block diagram of an exemplary network architecture useful in conjunction with various principles described herein, wherein the 3GPP core functions are integrated within a third party service provider (e.g., MNO) network that is in contact with an MSO core.

In contrast, in the embodiment of FIG. 12, the architecture 1200 is divided among two or more entities, such as an MNO and an MSO. As shown, the MSO service domain extends only to the CPE/FWA and served premises and the MSO core functions, while other functions such as 3GPP EPC/E-UTRAN or 5GC and NG-RAN functionality is provided by one or more MNO networks 1232 operated by MNOs with which the MSO has a service agreement. In this approach, the ProSe Application server is still maintained and operated by the MSO (since the MSO maintains cognizance over the CPE/FWA which must communicate via ProSe), although this is not a requirement, and the present disclosure contemplates embodiments where the ProSe function is maintained by the MNO or even a third party. The approach of FIG. 12 has the advantage of, inter alia, avoiding more CAPEX by the MSO, including duplication of infrastructure which may already service the area of interest, including reduced RF interference due to addition of extra (and ostensibly unnecessary) xNBs or other transceivers.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computerized premises apparatus for use in a wireless network, comprising:
    at least one wireless interface;
    processor apparatus in data communication with the at least one wireless interface; and
    storage apparatus in data communication with the processor apparatus, the storage apparatus comprising at least one computer program configured to, when executed by the processor apparatus, cause the computerized premises apparatus to:
        utilize the at least one wireless interface to obtain first data relating to a performance or capability of a wireless connection with at least one base station in wireless range of the at least one wireless interface of the computerized premises apparatus;
        cause communication with at least one fixed wireless access (FWA) device within wireless range of the computerized premises device to request supplementation of the wireless connection, the at least one fixed FWA device configured to operate within a frequency range between 3.550 and 3.70 GHz inclusive;
        obtain second data from the at least one FWA device enabling establishment of at least a second wireless connection, the second wireless connection between the computerized premises apparatus and the at least one FWA device; and
        based at least on the obtained second data, cause establishment of the at least second wireless connection via at least one frequency within a spectrum grant, wherein the establishment of the at least second wireless connection is configured to follow a receipt of the spectrum grant, the receipt of the spectrum grant based at least on a request issued to a spectrum allocation system in data communication with the wireless network, the request initiated via the at least one FWA device.

2. The computerized premises apparatus of claim 1, wherein the computerized premises apparatus comprises a FWA (fixed wireless access) device configured to operate in a CBRS (citizens broadband radio service) frequency band, and the at least one base station comprises a 3GPP-compliant gNodeB (gNB) configured to operate in the same CBRS frequency band.

3. The computerized premises apparatus of claim 1, wherein the at least one computer program is further configured to, when executed by the processor apparatus:
    utilize the obtained first data to determine that the first connection cannot meet a prescribed performance level requirement associated with the computerized premises apparatus; and
    based at least on the determination, cause said communication with the at least one fixed wireless access (FWA) device within wireless range of the computerized premises device to request supplementation of the wireless connection, the communication to request supplementation comprising third data relating to an amount of bandwidth supplementation required by the computerized premises apparatus.

4. The computerized premises apparatus of claim 3, wherein the utilization of the obtained first data to determine that the first connection cannot meet the prescribed performance level requirement associated with the computerized premises apparatus comprises determination of the amount.

5. The computerized premises apparatus of claim 1, wherein the utilization of the at least one wireless interface to obtain the first data comprises measurement, via use of an application computer program operative to execute on the computerized premises apparatus, of at least one actual performance metric relating to the second wireless connection, the application computer program configured to measure at least one of Transmission Control Protocol (TCP) packet performance or User Datagram Protocol (UDP) packet performance.

6. The computerized premises apparatus of claim 1, wherein the at least one computer program is further configured to, when executed by the processor apparatus, cause the computerized premises apparatus to:
    receive at least one message from at least one computerized process within a managed wireless network serving the computerized premises apparatus, the received at least one message comprising data relating to the spectrum grant; and
    utilize at least the received at least one message to establish the second wireless connection.

7. A computerized method of operating a fixed wireless access (FWA) device within a wireless network, the computerized method comprising:
    determining a deficiency in the operating of the FWA device;
    identifying at least one other FWA device capable of supplementing the operation of the FWA device;
    causing establishment of a wireless connection to the identified at least one other FWA device by at least causing data representative of a request to be transmitted from the at least one other FWA device to a spectrum allocation system in data communication with the wireless network to obtain at least one spectrum grant, at least one frequency within the at least one spectrum grant being utilized to establish the wireless connection; and
    transacting data with the at least one other FWA device in order to remedy the deficiency;
    wherein the FWA device is configured to operate within a frequency range between 3.550 and 3.70 GHz inclusive.

8. The computerized method of claim 7, wherein the determining of the deficiency comprises determining that a data rate associated with the FWA device does not meet a prescribed service level agreement (SLA) requirement, the SLA between a subscriber of a network operator managing the wireless network and the network operator.

9. The computerized method of claim 8, further comprising:
   conducting, at the FWA device, an evaluation to determine an additional capacity that is required to be provided to the FWA device in order to meet or exceed the SLA;
   receiving data from respective ones of a plurality of other FWA devices, the received data indicating a respective additional capacity capability; and
   based at least on the received data and the determined additional capacity, selecting the at least one other FWA device from the plurality of other FWA devices with which to establish the wireless connection.

10. The computerized method of claim 7, wherein the identifying of the at least one other FWA device capable of supplementing the operation of the FWA device comprises evaluating data regarding ones of a plurality of other FWA devices within wireless range of the FWA device.

11. The computerized method of claim 7, further comprising:
   receiving at the FWA device data relating to the at least one spectrum grant from a base station within the wireless network, and
   utilizing the received data relating to the at least one spectrum grant in the establishment of the wireless connection.

12. The computerized method of claim 7, further comprising:
   receiving at the FWA device data relating to the at least one spectrum grant from another FWA device within the wireless network, and
   utilizing the received data relating to the at least one spectrum grant in the establishment of the wireless connection.

13. The computerized method of claim 7, wherein the causing of the data representative of the request to be issued to the spectrum allocation system in data communication with the wireless network to obtain the at least one spectrum grant comprises causing the data representative of the request to be initiated via at least one other FWA device.

14. Computer readable apparatus comprising a non-transitory storage medium, the non-transitory storage medium comprising at least one computer program having a plurality of instructions, the plurality of instructions configured to, when executed on a digital processing apparatus, cause a computerized apparatus to:
   utilize the at least one wireless interface to receive data relating to a request from another computerized premises apparatus for a wireless connection between the computerized premises apparatus and the another computerized premises apparatus;
   determine an amount of wireless bandwidth that the computerized premises apparatus can provide via the requested wireless connection;
   communicate second data to the another computerized premises apparatus, the second data relating to the determined amount of wireless bandwidth, the second data enabling the another computerized premises apparatus to determine whether to establish the wireless connection based at least on the received data and an adequacy of the determined amount of wireless bandwidth; and
   based on a determination by the another computerized premises apparatus to establish the wireless connection:
      obtain a grant for an allocation of at least one licensable frequency band;
      perform the determination of whether to establish the requested wireless connection; and
      cause establishment of the wireless connection using the at least one licensable frequency band.

15. The computer readable apparatus of claim 14, wherein the determination of the amount of wireless bandwidth that the computerized premises apparatus can provide via the requested wireless connection comprises evaluation of a second wireless connection between the at least one wireless interface of computerized premises apparatus and a base station of a managed wireless network, the evaluation comprising measurement of at least one actual performance metric relating to the second wireless connection.

16. The computer readable apparatus of claim 15, wherein:
   the computerized premises apparatus comprises a FWA device configured to operate in a CBRS (Citizens Broadband Radio Service) frequency band, and the base station comprises a 3GPP-compliant gNodeB (gNB) configured to operate in the same CBRS frequency band; and
   the second wireless connection comprises operation in an RRC_Connected state.

17. The computer readable apparatus of claim 15, wherein the measurement of at least one actual performance metric relating to the second wireless connection comprises use of an application computer program operative to execute on the computerized premises apparatus, the application computer program configured to measure at least one of Transmission Control Protocol (TCP) packet performance or User Datagram Protocol (UDP) packet performance.

18. The computer readable apparatus of claim 14, wherein the at least one computer program is further configured to, when executed by the processor apparatus, cause the computerized premises apparatus to generate at least one message relating to a request for a spectrum allocation for use in establishing the second wireless connection.

19. The computer readable apparatus of claim 18, wherein the at least one computer program is further configured to, when executed by the processor apparatus, cause the computerized premises apparatus to establish a communication session with at least one computerized process within a managed wireless network serving the computerized premises apparatus, the communication session configured to enable transmission of the generated at least one message for forwarding to a computerized spectrum allocation process.

20. The computer readable apparatus of claim 19, wherein the at least one computer program is further configured to, when executed by the processor apparatus, cause the computerized premises apparatus to:
   receive at least one message from the at least one computerized process, the received at least one message comprising data relating to the spectrum grant; and
   utilize at least the received at least one message to establish the second wireless connection.

* * * * *